US011936938B2

(12) United States Patent
Bakar et al.

(10) Patent No.: US 11,936,938 B2
(45) Date of Patent: *Mar. 19, 2024

(54) SYSTEMS, METHODS, AND MEDIA FOR PRESENTING MEDIA CONTENT

(71) Applicant: Google LLC, Mountain View, CA (US)

(72) Inventors: Majd Bakar, San Jose, CA (US); Francis Tsui, Belmont, CA (US); John Affaki, San Jose, CA (US); Byungchul Kim, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,036

(22) Filed: Feb. 24, 2020

(65) Prior Publication Data

US 2020/0252571 A1 Aug. 6, 2020

Related U.S. Application Data

(63) Continuation of application No. 14/298,687, filed on Jun. 6, 2014, now Pat. No. 10,574,931.
(Continued)

(51) Int. Cl.
*H04N 21/426* (2011.01)
*H04L 65/61* (2022.01)
(Continued)

(52) U.S. Cl.
CPC .......... *H04N 21/426* (2013.01); *H04L 65/61* (2022.05); *H04L 67/1061* (2013.01);
(Continued)

(58) Field of Classification Search
CPC .......... H04N 21/426; H04N 21/41265; H04N 21/4108; H04N 21/4126; H04N 21/42209;
(Continued)

(56) References Cited

U.S. PATENT DOCUMENTS 8,745,159 B2 6/2014 Nakajima
10,136,127 B2 11/2018 Inata et al.
(Continued)

FOREIGN PATENT DOCUMENTS

CN 101202889 12/2009
CN 102694603 9/2012
(Continued)

OTHER PUBLICATIONS

Examination Report dated Feb. 3, 2017 in European Patent Application No. 14734696.9.
(Continued)

*Primary Examiner* — Joshua D Taylor
(74) *Attorney, Agent, or Firm* — Kilpatrick Townsend & Stockton LLP

(57) ABSTRACT

Systems, methods, and media for presenting media content are provided. In some implementations, a system for presenting media content is provided, the system comprising: a hardware processor that is programmed to: establish a connection with a media playback device; respond to a discovery request from a computing device presenting a media content item; establish a persistent communication channel with the computing device over a network in response to a request from the computing device to establish the persistent communication channel; receive identifying information of the media content item being presented by the computing device and identifying information of a source of the media content item being presented by the computing device; request the media content item from the identified source of the media content item as a stream of media content; and cause the media content item to be presented using the media playback device.

18 Claims, 19 Drawing Sheets

Related U.S. Application Data

(60) Provisional application No. 61/831,915, filed on Jun. 6, 2013, provisional application No. 61/831,887, filed on Jun. 6, 2013.

(51) Int. Cl.

| | | |
|---|---|---|
| *H04L 67/1061* | (2022.01) | |
| *H04L 67/148* | (2022.01) | |
| *H04N 21/41* | (2011.01) | |
| *H04N 21/422* | (2011.01) | |
| *H04N 21/436* | (2011.01) | |
| *H04N 21/462* | (2011.01) | |
| *H04N 21/47* | (2011.01) | |
| *H04N 21/81* | (2011.01) | |
| *H04N 21/858* | (2011.01) | |
| *H04N 21/443* | (2011.01) | |

(52) U.S. Cl.
CPC ....... *H04L 67/148* (2013.01); *H04N 21/4108* (2013.01); *H04N 21/41265* (2020.08); *H04N 21/42209* (2013.01); *H04N 21/4222* (2013.01); *H04N 21/43615* (2013.01); *H04N 21/4622* (2013.01); *H04N 21/47* (2013.01); *H04N 21/8166* (2013.01); *H04N 21/858* (2013.01); *H04N 21/42224* (2013.01); *H04N 21/4431* (2013.01)

(58) Field of Classification Search
CPC ......... H04N 21/4222; H04N 21/43615; H04N 21/4622; H04N 21/47; H04N 21/8166; H04N 21/858
See application file for complete search history.

(56) References Cited

U.S. PATENT DOCUMENTS

| | | |
|---|---|---|
| 2005/0166242 A1 | 7/2005 | Matsumoto et al. |
| 2006/0253873 A1* | 11/2006 | Lim .................. H04L 67/24 725/62 |
| 2007/0053514 A1 | 3/2007 | Imai et al. |
| 2008/0163330 A1 | 7/2008 | Sparrell |
| 2009/0081950 A1 | 3/2009 | Matsubara et al. |
| 2010/0045594 A1 | 2/2010 | Jenks et al. |
| 2010/0263016 A1 | 10/2010 | Itoga |
| 2010/0281108 A1 | 11/2010 | Cohen |
| 2012/0102526 A1* | 4/2012 | Lejeune ............. H04N 21/4722 725/40 |
| 2012/0131458 A1* | 5/2012 | Hayes ................ H04N 21/4788 345/173 |
| 2012/0166581 A1 | 6/2012 | Nakajima |
| 2013/0019265 A1* | 1/2013 | Waller ................ H04N 21/443 725/40 |
| 2013/0091239 A1 | 4/2013 | Hao et al. |
| 2013/0091529 A1 | 4/2013 | Hasegawa et al. |
| 2013/0232086 A1 | 9/2013 | Daniel |
| 2013/0305292 A1 | 11/2013 | Chen et al. |
| 2014/0029913 A1 | 1/2014 | Lopez et al. |
| 2014/0033257 A1 | 1/2014 | Hjelmstedt |
| 2017/0094226 A1* | 3/2017 | Guzik .................. H04L 65/605 |

FOREIGN PATENT DOCUMENTS

| | | |
|---|---|---|
| CN | 202949465 | 5/2013 |
| CN | 101741825 | 10/2016 |
| EP | 2315418 | 4/2011 |
| EP | 2680500 | 10/2019 |
| JP | 2002015118 | 1/2002 |
| JP | 2004135194 | 4/2004 |
| JP | 2007074529 | 3/2007 |
| JP | 2007259095 | 10/2007 |
| JP | 2007300391 | 11/2007 |
| JP | 2010081638 | 4/2010 |
| JP | 2011019002 | 1/2011 |
| JP | 2012138731 | 7/2012 |
| JP | 2013101631 | 5/2013 |
| KR | 20090031976 | 3/2009 |
| KR | 20100058616 | 6/2010 |
| WO | WO 2012149043 | 11/2012 |
| WO | WO 2013076777 | 5/2013 |

OTHER PUBLICATIONS

Frommer, D., "15 Things you can Remote Control with your iPhone", Jul. 21, 2009, pp. 1-2, available at: http://www.businessinsider.com/15-things-you-can-remote-control-with-your-iphone-2009-7.
International Search Report and Written Opinion dated Jan. 20, 2015 in International Patent Application No. PCT/US2014/041391.
Notice of Allowance dated Oct. 10, 2019 in U.S. Appl. No. 14/298,687.
Notice of Grant dated Jul. 2, 2019 in JP Patent Application No. 2016-518050.
Office Action dated Jan. 10, 2018 in U.S. Appl. No. 14/298,687.
Office Action dated Jan. 11, 2019 in U.S. Appl. No. 14/298,687.
Office Action dated Mar. 5, 2019 in JP Patent Application No. 2016-518050.
Office Action dated Mar. 11, 2016 in U.S. Appl. No. 14/298,687.
Office Action dated Mar. 27, 2018 in CN Patent Application No. 201480041439.7.
Office Action dated Apr. 18, 2017 in U.S. Appl. No. 14/298,687.
Office Action dated Apr. 24, 2018 in JP Patent Application No. 2016-518050.
Office Action dated Apr. 30, 2019 in U.S. Appl. No. 14/298,687.
Office Action dated Jul. 5, 2016 in U.S. Appl. No. 14/298,687.
Office Action dated Sep. 27, 2016 in U.S. Appl. No. 14/298,687.
Office Action dated Oct. 5, 2017 in U.S. Appl. No. 14/298,687.
Office Action dated Oct. 6, 2014 in U.S. Appl. No. 14/298,687.
Summons to Attend Oral Proceedings dated Mar. 7, 2018 in EP Application No. 14734696.9.
Wi-Fi Alliance, "Wi-Fi Certified Miracast: Extending the Wi-Fi Experience to Seamless Video Display", Sep. 19, 2012, pp. 1-18.
Examination Report dated Sep. 29, 2020 in IN Patent Application No. 201637000341.
Office Action dated Mar. 3, 2020 in KR Patent Application No. 10-2016-7000201.

\* cited by examiner

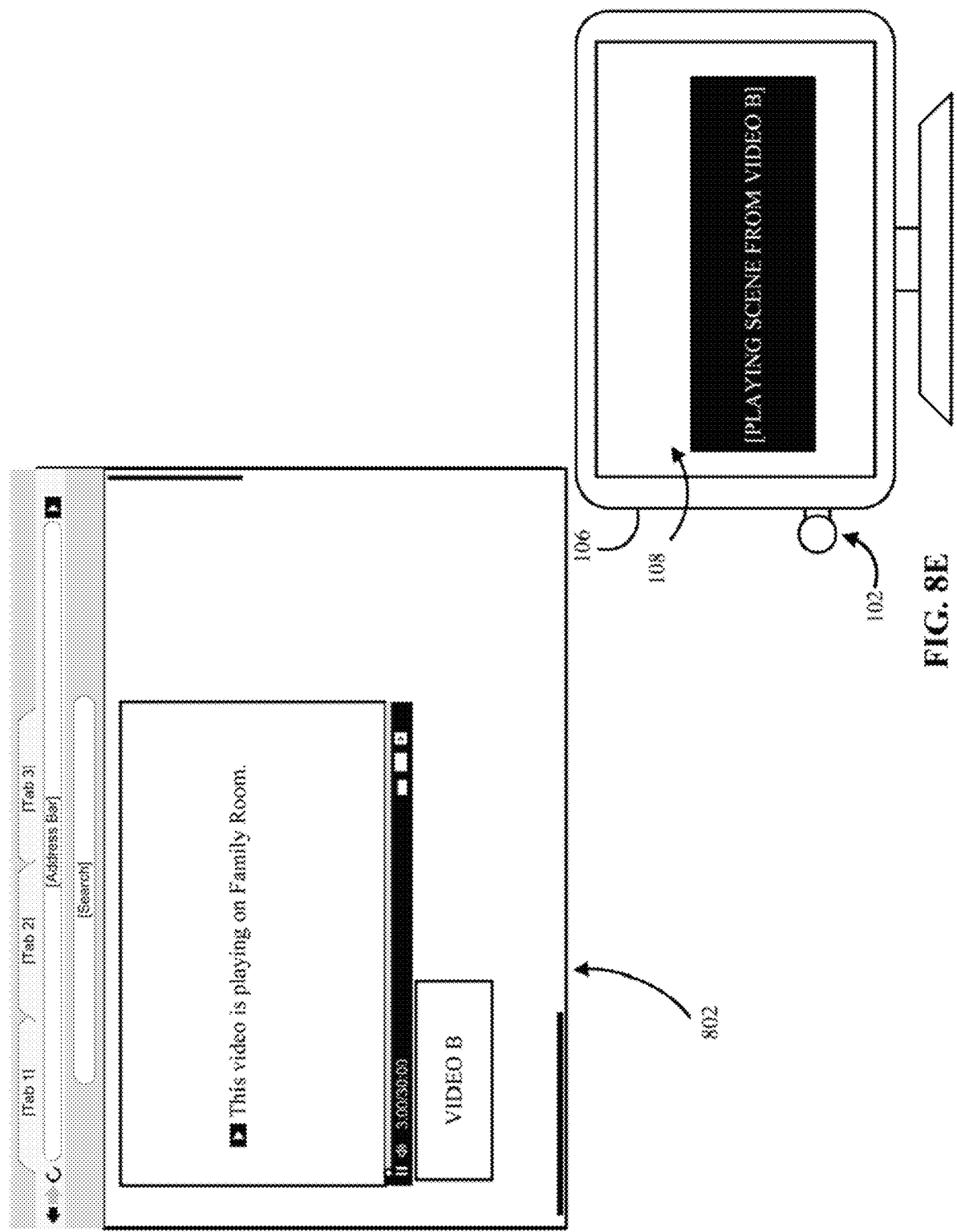

SYSTEMS, METHODS, AND MEDIA FOR PRESENTING MEDIA CONTENT

CROSS-REFERENCE TO RELATED APPLICATIONS

This application is a continuation of U.S. patent application Ser. No. 14/298,687, filed Jun. 6, 2014, which claims the benefit of U.S. Provisional Patent Application No. 61/831,887, filed Jun. 6, 2013, and U.S. Provisional Patent Application No. 61/831,915, filed Jun. 6, 2013, each of which is hereby incorporated by reference herein in its entirety.

TECHNICAL FIELD

Systems, methods and media for presenting media content are provided.

BACKGROUND

Personal electronic devices are often used to discover or browse media content for consumption, while devices having larger displays, such as televisions, are often used for consuming media content. However, playing the discovered media content from a personal electronic device to a television can be complicated and typically requires that the media content be retrieved by the personal electronic device and sent to the television for presentation, which typically involves expensive, inconvenient and/or complicated equipment for connecting the personal electronic device and the television.

Accordingly, new systems, methods, and media for presenting media content are desirable.

SUMMARY

In accordance with some implementations of the disclosed subject matter, mechanisms for presenting media content are provided.

In accordance with some implementations, a system for presenting content is provided, the system comprising: a hardware processor that is programmed to: establish a connection with a media playback device; respond to a discovery request from a computing device presenting a media content item; establish a persistent communication channel with the computing device over a network in response to a request from the computing device to establish the persistent communication channel; receive identifying information of the media content item being presented by the computing device and identifying information of a source of the media content item being presented by the computing device; request the media content item from the identified source of the media content item as a stream of media content; and cause the media content item to be presented using the media playback device.

In accordance with some implementations of the disclosed subject matter, a method for presenting content is provided, the method comprising: establishing, using a hardware processor, a connection with a media playback device; responding to a discovery request from a computing device presenting a media content item; establishing a persistent communication channel with the computing device over a network in response to a request from the computing device to establish the persistent communication channel; receiving identifying information of the media content item being presented by the computing device and identifying information of a source of the media content item being presented by the computing device; requesting the media content item from the identified source of the media content item as a stream of media content; and causing the media content item to be presented using the media playback device.

In accordance with some implementations of the disclosed subject matter, a non-transitory computer-readable medium containing computer executable instructions that, when executed by a processor, cause the processor to perform a method for presenting content is provided, the method comprising: establishing a connection with a media playback device; responding to a discovery request from a computing device presenting a media content item; establishing a persistent communication channel with the computing device over a network in response to a request from the computing device to establish the persistent communication channel; receiving identifying information of the media content item being presented by the computing device and identifying information of a source of the media content item being presented by the computing device; requesting the media content item from the identified source of the media content item as a stream of media content; and causing the media content item to be presented using the media playback device.

In accordance with some implementations of the disclosed subject matter, a system for presenting content is provided, the system comprising: means for establishing a connection with a media playback device; means for responding to a discovery request from a computing device presenting a media content item; means for establishing a persistent communication channel with the computing device over a network in response to a request from the computing device to establish the persistent communication channel; means for receiving identifying information of the media content item being presented by the computing device and identifying information of a source of the media content item being presented by the computing device; means for requesting the media content item from the identified source of the media content item as a stream of media content; and means for causing the media content item to be presented using the media playback device.

In some implementations, the system further comprises: means for receiving a command to pause presentation of the media content item from the computing device over the communication channel; and means for causing presentation of the media content item by the media playback device to be paused in response to the received command to pause presentation of the media content item.

In some implementations, the system further comprises means for sending a status of the presentation of the media content item by the media playback device to the computing device over the communication channel.

In some implementations, the status includes timing information related to a portion of the media content item that is currently being presented using the media playback device.

In some implementations, the status includes identifying information of the media content item that is currently being presented using the media playback device.

In some implementations, the system further comprises: means for receiving timing information of the media content item being presented by the computing device; and means for causing presentation of the media content item using the media playback device to begin at a particular time in the media content item based on the received timing information.

In some implementations, the identifying information of the source of media content item comprises at least a portion of a uniform resource identifier.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 8A-8E show an example of using the mechanisms described herein for presenting content used with a computing device running a browser in accordance with some implementations of the disclosed subject matter.

DETAILED DESCRIPTION

In accordance with some implementations of the disclosed subject matter, mechanisms (which can include systems, methods and media) for presenting media content are provided.

In some implementations, these mechanisms can allow a user to cause media content discovered on a computing device such as a smartphone, a tablet computer, or a personal computer to be presented on a larger and/or higher definition display such as a high definition television, while allowing the user to control the presentation of the media content on the device used to discover the content (e.g., the smartphone, etc.). In some implementations, a media receiving device, which can include a transmitter/receiver for connecting to a network, such as a wired and/or wireless network, can be connected to the television to stream the content identified by a computing device used to discover the content. In some implementations, the content can be received by a media receiving device from a content source, rather than directly from a computing device used to discover the content, which can allow the computing device to be used for other purposes, such as web browsing, email, etc., while the content is being presented by the media receiving device.

These mechanisms can be used in various applications. For example, these mechanisms can be used to present content on a larger display. As another example, these mechanisms can be used to discover and/or browse content on a familiar interface (e.g., a touch interface of a smartphone, a web browser of a personal computer, etc.), but present the content on a larger display where it can be more easily viewed by more users at the same time. As yet another example, these mechanisms can be used to allow multiple users to discover content simultaneously and share the content using a common display.

Figure 1:
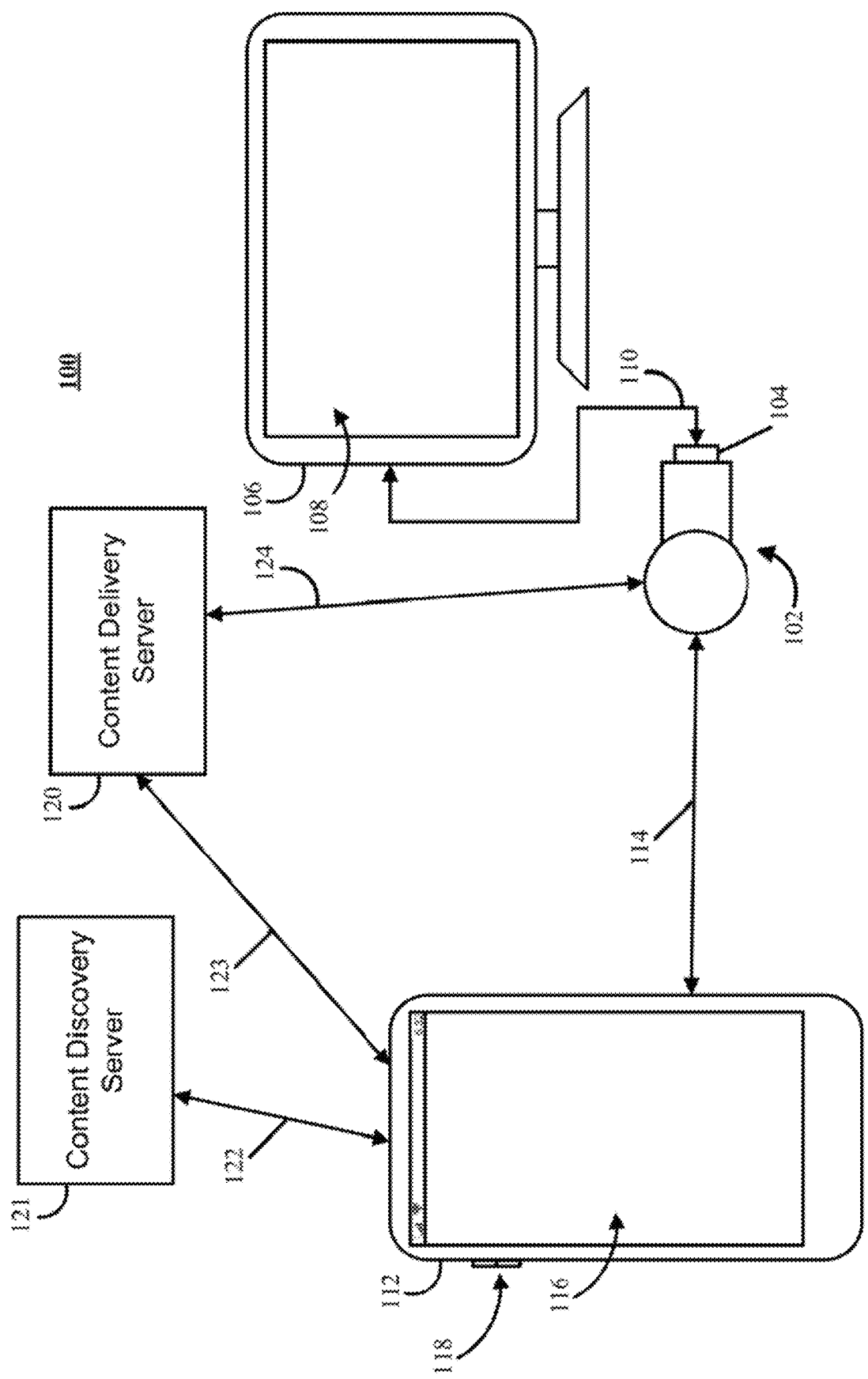
FIG. 1 shows an example of a system for presenting media content in accordance with some implementations of the disclosed subject matter.

Turning to FIG. 1, an example 100 of a system for presenting media content is shown in accordance with some implementations. In some implementations, system 100 can include a media receiving device 102, which can include an input/output connector 104. Input/output connector 104 can be any suitable input and/or output connector for communicating with a media playback device 106. For example, input/output connector 104 can be a High-Definition Multimedia Interface (HDMI) port, a Universal Serial Bus (USB) connector (e.g., a USB 3.0 connector), a THUNDERBOLT connector, a Digital Visual Interface (DVI) connector, a TOSLINK connector (e.g., a fiber optic audio connector), a Separate Video (S-Video) Connector, any other suitable connector and/or any suitable combination of connectors.

In some implementations, media playback device 106 can be a device that includes hardware and/or software for presenting media received from one or more sources of media content. For example, media playback device 106 can include a television, a smart television, a monitor, a set-top box, an audio video (AV) receiver, any other suitable media playback device and/or any suitable combination thereof. More particularly, media playback device 106 can include a display 108, speakers, hardware and/or software for rendering media content such as analog and/or digital video and/or audio data, a power supply, etc. Media playback device 106 can include various input ports for receiving video and/or audio data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc.

In some implementations, media receiving device 102 can be connected to media playback device 106 by a connection 110. Media receiving device 102 and media playback device 106 can be connected using any suitable technique(s). For example, connection 110 can include a plug of input/output connector 104 of media receiving device 102 inserted in a corresponding receptacle port of media playback device 106. As another example, a suitable cable, such as an HDMI cable, can be connected between input/output connector 104 and a port of media playback device 106. Additionally or alternatively, media receiving device 102 can be included as hardware and/or software of media playback device 106.

In some implementations, media receiving device 102 can be coupled to a computing device 112 using a communication link 114. Computing device 112 can be any suitable computing device, such as a smartphone, a tablet computer, a wearable computer, a laptop computer, a personal computer, an electronic reader, a digital media receiver, a smart television, a game console, any other suitable computing device, or any suitable combination thereof. In some implementations, communication link 114 can include any suitable communication link, for example, as described below in connection with FIG. 9. Additionally, communication link 114 can include a network, such as a local area network (LAN) having wired and/or wireless connections. Additionally or alternatively, communication link 114 can include a wireless connection between computing device 112 and media receiving device 102, such as an ad hoc wireless network. In some implementations, communications between computing device 112 and media receiving device 102 over communication link can be encrypted using any suitable encryption technique(s). For example, messages sent from computing device 112 to media receiving device 114 can be encrypted using any suitable encryption scheme, for example, using a public key-private key pair for encryption and decryption of messages. As another example, communications over communication link 114 can be encrypted using Transport Layer Security (TLS).

In some implementations, computing device 112 can include a display 116 for presenting a user interface to a user. In some examples described herein (e.g., examples described in connection with FIGS. 4-7F), computing device 112 can be a mobile computing device such as a smartphone or a tablet computer, and display 116 can include a touchscreen for receiving input and displaying a user interface and/or media content to a user. In some implementations, computing device 112 can further include volume controls 118 for controlling a volume of computing device 112.

In some implementations, computing device 112 can communicate with a content discovery server 121 over a communication link 122. Computing device 112 can be used to discover and/or browse content made available by a content delivery server 120. For example, a user can use computing device 112 to find media content to be presented. In some implementations, such media content can be presented using display 116 of computing device 112. In some implementations, computing device 112 can present a media content item that was selected using content discovery server 121, by requesting the media content item from content delivery server 120 and receiving the media content item over a communication link 123. In some implementations, each of content delivery server 120 and/or content discovery server 121 can be implemented on any suitable number of servers. Additionally or alternatively, in some implementations, the functions performed by content delivery server 120 and content discovery server 121 can be performed by the same device (e.g., by a common server computer).

In some implementations, communication links 122 and/or 123 can include a local area network (e.g., a home network) and/or a non-local network (e.g., the Internet). For example, computing device 112 can be connected to a common LAN such as a home network, and can connect to content discovery server 121 and/or content delivery server 120 through the Internet. As another example, content delivery server 120 and/or content discovery server 121 can be connected to a LAN that is common to computing device 112. In a more particular example, content delivery server 120 and/or content discovery server 121 can be located remotely from computing device 112, and communication links 122 and/or 123 can include a non-local network such as the Internet for accessing content from content delivery server 120 and/or discovering content using content discovery server 121. In another more particular example, content delivery server 120 and/or content discovery server 121 can be located locally to computing device 112, and communication links 122 and/or 123 can include a local network, such as a home network, to which content delivery server 120 and/or content discovery server 121 are connected. In such an example, a non-local network of communication links 122 and/or 123 (if it exists) may not be used when accessing content from content delivery server 120 and/or discovering content using content discovery server 121.

In some implementations, a user of computing device 112 can cause media content made available by content delivery server 120 to be transmitted to media receiving device 102, which can in turn cause the media content to be presented on display 108 of media playback device 106 to which media receiving device 102 is connected. In some implementations, media receiving device 102 can receive power from media playback device 106 through connection 110, and may only be available to receive media content when power is being received over connection 110 (e.g., when a port to which media receiving device 102 is connected is selected as an active input port).

In some implementations, if a user has selected a media content item to be presented from content delivery server 120, the user can select an icon presented to the user in connection with the selected media content item to cause the media content item to be presented using media receiving device 102. Presenting a media content item using media receiving device 102, in accordance with some implementations, is described below in connection with, for example, FIG. 2.

In some implementations, when a media content item is to be presented from content delivery server 120 using media receiving device 102, the media content item can be transmitted to media receiving device 102 over a communication link 124. Communication link 124 can include a local area network (e.g., a home network) and/or a non-local network (e.g., the Internet). For example, media receiving device 102 and computing device 112 can both be connected to a common LAN such as a home network, and can connect to content delivery server 120 through the Internet. As another example, content deliver server 120 can be connected to a LAN that is common to computing device 112 and/or media receiving device 102. In a more particular example, content delivery server 120 can be located remotely from media receiving device 102 and/or computing device 112, and communication link 124 can include a non-local network such as the Internet for accessing content from content delivery server 120. In another more particular example, content delivery server can be located locally to media receiving device 102 and/or computing device 112, and communication link 124 can include a local network, such as a home network, to which both media receiving device 102 and content delivery server 120 are connected. In such an example, a non-local network of communication link 124 (if it exists) may not be used when accessing content from content delivery server 120.

In some implementations, a user can choose a media content item to be presented using media receiving device 102 from a memory of computing device 112 (e.g., the user can choose a video that is stored locally on computing device 112). Additionally or alternatively, a user can choose a media content item to be presented using media receiving device 102 that is stored on another computing device present on the same local area network (e.g., network attached storage, a memory of a personal computer on a home network, memory on a server on the same network, etc.). Such a media content item stored on a computing device connected to a local area network can be transmitted from computing device 112 to media receiver 102 over communication link 114 (or any other suitable communication link), without being transmitted through content delivery server 120.

Figure 2:
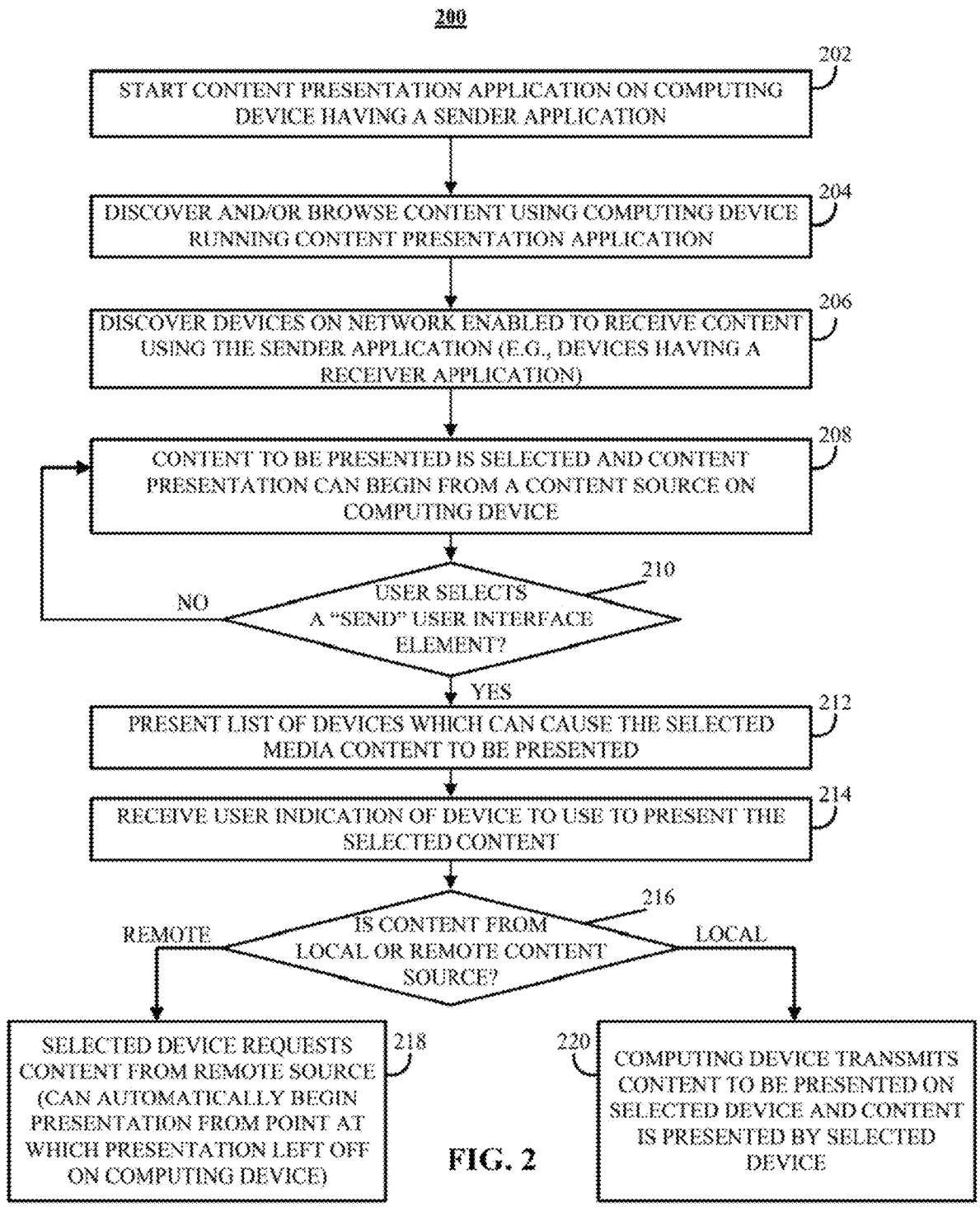
FIG. 2 shows an example of a process for presenting media content in accordance with some implementations of the disclosed subject matter.

FIG. 2 shows an example 200 of a process for presenting media content in accordance with some implementations of the disclosed subject matter. At 202, a content presentation application can be started on a computing device having a sender application. The content presentation application can include any suitable content presentation functions, such as discovering and/or browsing content to be presented, software to enable rendering and/or presentation of content such as video and/or audio content (which can include still images).

In some implementations, a sender application can be incorporated as part of the content presentation application and/or as a separate application that can be executed by an operating system of the computing device running the content presentation application (e.g., computing device 112). In some implementations, the sender application can be an application programming interface (API) for communication with a receiver application, for example, as described below. Such a sender application can be configured to receive commands from a computing device, such as computing device 112, and send these commands to a media receiving device (e.g., media receiving device 102). Among other things, the sender application can instruct a computing device to perform the following functions: cause a computing device running the application to discover the presence of media receiving devices (e.g., media receiving devices 102 on a home network, or the like); receive a selection of a media receiving device with which the computing device running the sender application is to communicate; and establish one or more communication channels with the selected media receiving device to be able to send and/or receive communications.

In some implementations, the sender application can include a set of standard software instructions, such as one or more portions of a software developer kit (SDK) (e.g., a Content Sender SDK) for performing, among other things, the above functions. The sender application can, for example, expose certain controls of a media receiving device (such as media receiving device 102), such as play, pause, stop, and volume control. Additionally, the sender application can periodically receive status updates from the media receiving device regarding, e.g., whether a media content item is being played, an identity of the media content item, a time of the media content item, etc.

In some implementations, the sender application can start in response to the computing device starting the content presentation application. Alternatively, the sender application can start when the computing device is started and run as a background application, or start in response to a user selecting an icon that corresponds to a function for using the sender application to present media content on a media receiving device.

At 204, the content presentation application can discover and/or browse content using the computing device running the content presentation application. For example, the content presentation application can be an application for a video sharing service that allows a user of the application to view videos uploaded by users of the video sharing service. Such a content presentation application can allow a user of the application to discover videos to watch using search functions, recommendations, curated lists, channels, randomly, or any other suitable techniques for facilitating discovery and/or browsing of content by a user. As another example, the content presentation application can be a Web browser that can, among other things, allow a user to discover and/or browse Web pages.

At 206, the sender application can cause the computing device running the sender application to discover media receiving devices (e.g., media receiving device 102) that are present on a network that the computing device is connected to (e.g., a home network). Any suitable technique(s) can be used to discover devices, such as multicasting a message to a particular address on the network, and launching an event listener to listen for replies from devices on the network that received the multicast message. Additionally, in some implementations, an event listener associated with the device executing process 200 can listen for messages sent from a media receiving device (e.g., media receiving device 102) that may not be a response to a multicast message previously sent by such a device. Such a message can be a broadcast, multicast, or unicast message sent by the media receiving device. In some implementations, the sender application can start and discover devices at 206 in response to the computing device launching the content presentation application and/or starting the sender application, in response to a user selecting a "send" icon as described below in connection with 210, periodically, or at any other suitable time.

At 208, the content presentation application can receive a user indication of a media content item to be presented, and presentation of the media content item can begin on the computing device running the content presentation application. Additionally or alternatively, the selected media content item may not be presented on the computing device upon selection, but instead the content presentation application can wait for a user instruction to present the media content item.

At 210, the content presentation application and/or the sender application can determine whether a user has selected a "send" icon (or any other suitable indication to send the media content item to a media receiving device, such as a voice command, entering a text command, etc.) to send the selected media content item to a media receiving device (e.g., media receiving device 102). A determination of whether the user has selected the "send" icon can be made using any suitable technique, for example by receiving a signal from the computing device running the content presentation application indicating that a user selection of the "send" icon has been received. If the content presentation application and/or sender application determines that a user selection of the "send" icon has not been received ("NO" at 210), process 200 can return to 208 and continue to present the selected media content item (if being presented). Otherwise, if the content presentation application and/or sender application determines that a user selection of the "send" icon has been received ("YES" at 210), process 200 can proceed to 212.

At 212, the sender application can cause the computing device running the sender application to present a list of media receiver devices which can cause the selected media content item to be presented. A list of media receiving devices (e.g., including media receiving device 102) can be created based on the media receiving devices that were discovered at 206. In some implementations, devices that have previously been used to present media content items using the sender application can be included in the list regardless of whether the device responded to the discovery request at 206. For example, devices that have previously been used can be presented to the user in the list of devices with an indication that the device was not discovered (e.g., the device is offline or not in the network). In some implementations, presenting the list of devices to the user can be omitted, for example, if the user has previously chosen a default media receiving device to use to present content, and/or if only one media receiving device is detected during device discovery at 206. In some implementations, device discovery at 206 can be performed in parallel with presentation of content at 208, in response to selection of "send" user interface element at 210 (e.g., in response to "YES" at 210), and/or at any other suitable time.

At 214, the sender application can receive an indication of a media receiving device to use to present the content selected at 208. For example, the sender application can receive a signal from the computing device running the sender application of a device that was selected by the user as the media receiving device to use to present the media content item selected at 208.

In some implementations, a communication session between the computing device running the sender application and the selected media receiving device can be initiated in response to receiving the selection of the media device at 214. Initiation of the session can cause a secure connection to be created between the communication device running the sender application and the selected media receiving device running the receiver application. This session can include sending a call to the selected media receiving device over the network and launching an application for causing the media content item selected at 208 to be presented using the selected media receiving device.

In some implementations, initiating the session can further include launching a listener for receiving communications from a receiver application running on the selected media receiving device. After the session is initiated, a channel can be created for communication directly between the sender application running on the computing device running the content presentation application and the receiver application (described below in connection with FIG. 3) running on the selected media receiving device. This channel can be used to send commands from the computing device running the sender application to the selected media receiver application running the receiver application, such as a command to present a selected media content item, a command to play the media content item, a command to pause the media content item, etc. A computing device running the sender application and a media receiving device are sometimes referred to herein as being paired devices when a channel has been established between them as described above. Additionally or alternatively, in some implementations, the sender application can send any suitable commands and/or instructions, such as commands and/or instructions to present particular content (e.g., content that is selected at 208) over the channel described above and/or using a non-persistent connection. For example, commands and/or instructions can be sent over a non-persistent connection by sending a request to the media receiving device using a transient channel (e.g., communicating using Hypertext Transfer Protocol messages addressed to the media receiving device). In some implementations, certain commands and/or instructions can be sent using a non-persistent connection during an initialization period of the media receiving device and/or when a receiver application of the media receiving device is launching, prior to the persistent connection being established, during initialization of the persistent communication channel, and/or at any other suitable timing.

In some implementations, when a channel is created between the computing device running the sender application and a media receiver device, the sender application can send instructions to launch a content streaming application that corresponds to the content presentation application that was used for discovering and/or browsing content at 204 and/or selecting content at 208.

At 216, the sender application can determine whether the source of the media content item is local (e.g., on the computing device running the sender application) or remote (e.g., on a content delivery server, on a network attached storage, on a personal computer on the network, etc.). If the sender application determines that the source of the media content item is remote ("REMOTE" at 216), process 200 can proceed to 218.

At 218, the sender application can cause the selected media receiving device to request the content item from the remote source from which the content item is available (e.g., a remote server, network attached storage, etc.) using any suitable communication protocols such as hypertext transfer protocol (HTTP), any suitable streaming protocol, file transfer protocol (FTP), protocols corresponding to Digital Living Network Alliance (DLNA) standards, or any other suitable protocol. In some implementations, if the media content item was presented by the computing device running the content presentation application the media receiver application can cause the media content item to be presented where the computing device left off presenting the media content item.

Otherwise, if the sender application determines that the source of the media content item is local ("LOCAL" at 216), process 200 can proceed to 220.

At 220, the sender application can cause the computing device running the content presentation application to transmit the content to the selected media receiving device over the network. The sender application can then cause the selected media receiving device to present the content, using a channel established between the computing device running the sender application and the selected media receiver device. In some implementations, a channel for sending the content from the device executing process 200 (e.g., computing device 112) to the selected media receiving device (e.g., media receiving device 112) can be a separate channel than a channel for sending commands and/or instructions to media receiving device 112. For example, a channel for sending commands and/or instructions can be a control channel, and a channel for sending content can be a data channel. Alternatively, content can be sent over the same channel as commands and/or instructions.

In some implementations, the media content item can include a Web page or portion of a Web page being rendered by computing device 112. In such implementations, the Web page can be considered to be a locally stored media content item and can be transmitted directly from computing device 112 to media receiver 102 (e.g., over a network such as a home network) as a video object (e.g., the Web page can be rendered by computing device 112 and a video corresponding to the content can be transmitted to media receiver 102). Alternatively, the Web page can be considered to be a remote media content item and can be requested by media receiving device 102 and rendered using, for example, a web browser application launched by media receiving device 102.

Figure 3:
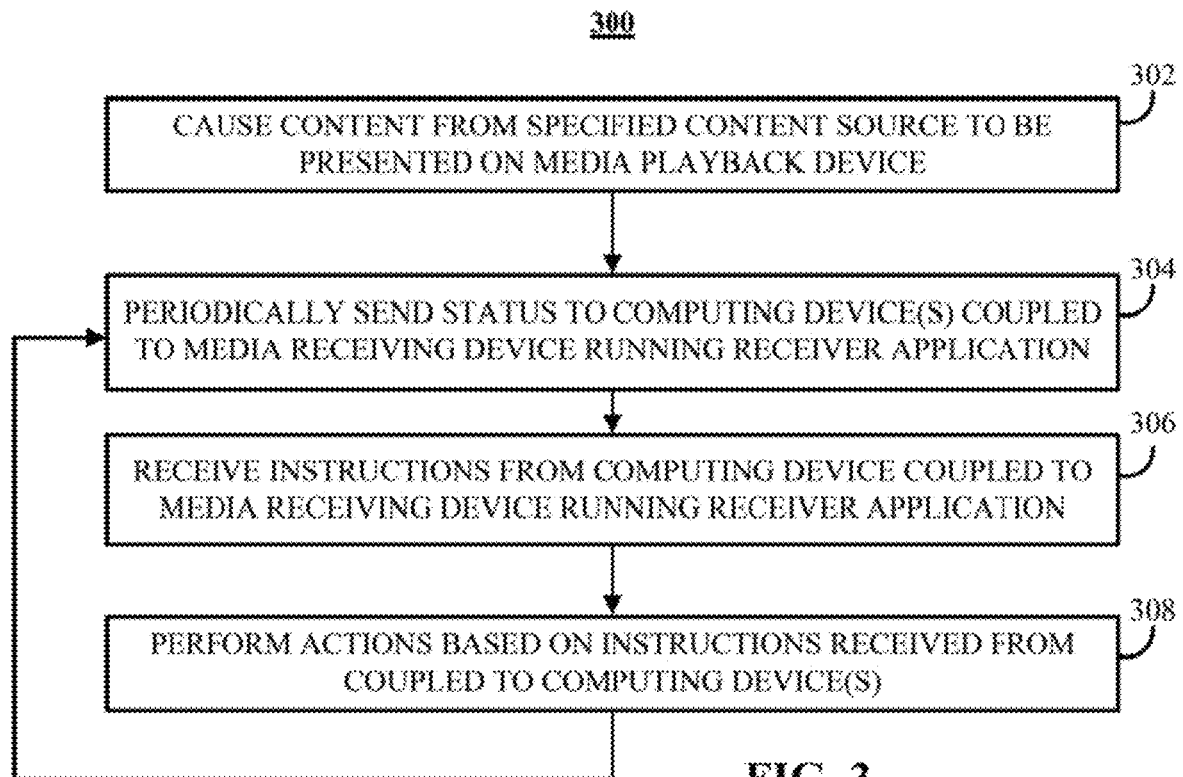
FIG. 3 shows an example of a process for receiving and presenting media content using a media receiving device in accordance with some implementations of the disclosed subject matter.

FIG. 3 shows an example 300 of a process for receiving and presenting media content using a media receiving device running a receiver application. As described above, a media receiving device (e.g., media receiving device 102) can run a receiver application for receiving requests and commands from computing devices that are running a sender application. When a discovery request is received from a sender application, the receiver application can cause the media receiving device to respond to the discovery request and establish a control and/or data channel with the computing device that sent the discovery request in response to the sender application indicating that a channel is to be established.

In some implementations, the receiver application can be an application programming interface (API) for communication with the sender application as described above. Such a receiver application can be executed by a media receiving device (e.g., media receiving device 102) to receive commands from a sender application running on a computing device, such as computing device 112. Among other things, the receiver application can perform the following functions: respond to discovery requests sent by a computing device running the sender application; establish one or more communication channels with the computing device to be able to send and/or receive communications; download and/or launch a streaming application for presenting content; and relay instructions received over the one or more communication channels to a streaming application being used by the media receiving device to present a media content item.

In some implementations, the receiver application can include a set of standard software instructions, such as one or more portions of a software developer kit (SDK) (e.g., a Content Receiver SDK) for performing the above functions. The receiver application can, for example, launch a listener for receiving discovery requests from computing devices (e.g., computing device 112) running the sender application, create a persistent connection with the computing device for sending and receiving commands and/or messages, download and render a streaming application, receive commands from the computing device running the sender application, and relay the command to the streaming application (e.g., in a default format or in a format particular to the source of content associated with the streaming application). Additionally, the receiver application can periodically send status updates from the media receiving device regarding, e.g., whether a media content item is being played, an identity of the media content item, a time of the media content item, etc. In some implementations, commands specific to a particular content presentation application and/or content streaming application can be sent and/or received by the receiver application. Such application specific commands can be relayed from the content presentation application to the streaming application via the sender application and receiving application, and vice versa. For example, a streaming application that requires an authentication token to receive and present a media content item can request such an authentication token from the content presentation application through the receiver application and the sender application.

In some implementations, the receiver application can start in response to the media receiving device being initiated (e.g., powering on). Additionally, the receiver application can run as a background application and/or start in response to a listener application running on the media receiving device receiving a discovery request from a sender application.

In some implementations, the media receiving device running the receiver application can receive instructions to launch a content streaming application that corresponds to the content presentation application running on the computing device running the sender application. Such instructions can include address information (e.g., a URI, a URL, a URN, an IP address, and/or any other suitable address information) where the content streaming application can be downloaded, software corresponding to the content streaming application, an indication of a pre-installed content streaming application to launch, or any other suitable instructions to launch the content streaming application.

In some implementations, the receiver application can cause the media receiving device to download the content streaming application from the received address. The content streaming application can then be rendered by the media receiving application in order to render a content item (e.g., a content item selected at 208). The content streaming application can include any suitable software for causing the media receiving device to present a content item on a connected media playback device. For example, the streaming application can include hypertext markup language (HTML), JavaScript (JS), or any other suitable programming language.

In some implementations, when the receiver application launches a content streaming application, the receiver application can cause an application context to be created. For example, an application context identified as "Fling" can be created as an origin for messages to be received from the receiver application by the content streaming application. In some implementations, when a content streaming application is done being rendered, the receiver application can set any suitable target for commands that are received from the sender application. For example, the receiver application can set a video tag of the content streaming application as a target for commands that are received from the sender application. As another example, the receiver application can set a video element of the content streaming application as a target for commands that are received from the sender application. These commands can then be executed by the media receiving device upon receiving the command from a sender application. Additionally or alternatively, a destination for commands received from the sender can be set to a particular event handler, which can receive the commands and determine how to properly respond to the received command.

At 302, the media receiving device running the receiver application (e.g., media receiving device 102) can cause content specified by a sender application to be presented on a media playback device (e.g., media playback device 106) after a streaming application has been launched. The content can be requested from a particular address specified by the sender application and/or can be received from the computing device running the sender application.

At 304, the media receiving device running the receiver application can periodically send a status to any computing devices with which a channel has been established. Such a status can include, for example, a play/pause state, a completion percentage of the media content item, metadata related to the media content item being presented, and/or any other suitable information.

At 306, the media receiving device running the receiver application can receive instructions from computing devices that are coupled to the media receiving application. For example, instructions can include a play command, a pause command, a volume command, etc.

At 308, the media receiving device running the receiver application can perform actions based on instructions received from a coupled device. For example, the media receiving device can instruct the streaming application that is causing a media content item to be presented to pause presentation of the media content item in response to receiving a pause command. After any actions are performed at

308, process 300 can return to 304 and continue to send status updates. In some implementations, the computing device running the sender application can send a request for a status update, and the receiver application can cause a status update to be sent asynchronously (e.g., not corresponding to a particular period, a status update can be sent whenever a command from among a predetermined subset of commands is received, etc.).

In some implementation, the media receiving device can be configured to support a single concurrent media stream playback. For example, a document object model (DOM) running on the media receiving device can be configured such that only one active video element can be created and/or executed at any given time.

In some implementations, the media receiving device can be configured to present media content that is received in one of a predetermined subset of formats. Any suitable video and/or audio formats can be used, which can include any suitable video and/or audio encoding and/or decoding protocols, code, software, etc. For example, the media receiving device can support a predetermined subset of digital rights management (DRM) formats, such as Widevine, Playready, or any other suitable DRM format. As another example, the media receiving device can support a predetermined subset of video formats, such as VP8, or any other suitable video format. As yet another example, the media receiving device can support a predetermined subset of audio formats, such as MP3, CELT/OPUS, or any other suitable audio format. As still another example, the media receiving device can support a predetermined subset of audio-video formats (e.g., container formats) such as MP4, fragmented MP4 (fMP4), WebM, or any other suitable audio-video format. As a further example, the media receiving device can support a predetermined subset of media streaming formats, such as adaptive bitrate streaming based on any suitable streaming technique(s), or any other suitable media streaming format. In some implementations, audio and/or video received by the media receiving device can be encrypted using any suitable encryption technique(s). For example, the audio and/or video received by the media receiving device can be encrypted using the Common Encryption Scheme (CENC), or any other suitable encryption scheme.

In some implementations, commands sent by the sender application can include:

LOAD

In some implementations, a LOAD command can include fields for "source" which can contain a <content_id>, a field for "title", a Boolean (e.g., true/false) field for "autoplay", a "content_info" field, and/or any other suitable field. This command can be used to load new content into the media player. The <content id> can contain an identity of the media to be loaded, which can have any suitable format. For example, <content id> can include a uniform resource identifier (URI), a uniform resource locator (URL), a uniform resource name (URN), an IP address, and/or any other suitable information for specifying a particular source of content and/or item of content. In some implementations, the <content id> can include identifying information of a source and/or identifying information of a media content item available from the source. The format of this field can be defined by the content presentation application, the content streaming application, a media player, and/or using any other suitable technique(s).

If the autoplay field is specified as "true" in LOAD, the content streaming application can begin playing the content when it is loaded. In some implementations, even if autoplay is not specified, the media streaming application can be configured to begin playback immediately. If playback is started, a player state in a status message can be set to "PLAYING," otherwise it can be set to "STOPPED."

The title field can optionally provide a user readable descriptive string for the content being loaded. If provided, the string can be used by the content streaming application as an initial value for the title field of each STATUS object sent from the content streaming application and/or receiver application. Whether or not the title is provided in the LOAD message, the content streaming application can modify the title field at any point based on the implementation of the content streaming application.

The content_info field can contain a JSON object which can give more in-depth information about the content being loaded, e.g. an identification of a TV service, an episode number, etc. If provided, the content_info object can be used as the initial value of the content_info field of each STATUS message (described below). The content streaming application and/or receiver application can modify the content_info at any point, based on, for example, metadata received with a media content item to be presented.

PLAY

In some implementations, a PLAY command can cause playback of the content that was loaded with the load call to be started and/or can change the playback position of currently loaded content. The PLAY command can include a position field, which can be given in seconds and can specify a position in the current content from which to start playback. If a position is not specified, playback can be continued from the current position. If a position that is provided is outside the range of valid positions of the current content, then the content streaming application can determine a valid position as close to the requested position as possible. In some implementations, when a PLAY command is received, a STATUS message can be sent to paired computing devices by the receiver application.

STOP

In some implementations, a STOP command can cause playback of the content to be halted. In some implementations, when a STOP command is received, a STATUS message can be sent to paired computing devices by the receiver application.

VOLUME

In some implementations, a VOLUME message can cause a volume output by the media receiving device (e.g., media receiving device 102) to be adjusted, and/or can cause a command to be issued to a media playback device connected to the media streaming device to change the volume output by the media playback device. A VOLUME message can include a field for a volume to be set. Such a field can be given as a number in a predetermined range, such as 0.0 to 1.0, where each decimal value can correspond to a particular volume. Additionally, in some implementations, a VOLUME message can include a muted field for specifying that the volume is to be muted or unmuted (e.g., based on a current state of the volume). In some implementations, the muted field can be a Boolean flag that if true can cause the volume to be muted if not currently muted, and unmuted if currently muted, and if false can cause no action to be taken with regard to a current mute status.

STATUS

A STATUS message can be sent from the content streaming application and/or the receiver application running on the media receiving application to the sender application and/or the content presentation application running on a paired computing device. This status message can contain status information related to the status of the content streaming application and/or content currently being presented by the content streaming application. Such status information can include a status object.

In some implementations, a status object can include fields for "event_sequence", "state", "active_input", "content_id", "title", "time_progress", "current_time", "duration", "volume", "content_info", "identity", "error" and any other suitable fields.

In some implementations, "event_sequence" can include a sequence number that can be used to identify a relative position of status events received in response to operations (e.g., LOAD, PLAY, etc.), and those received from unsolicited status updates (e.g., periodic updates). When a status event is received in response to an operation, any status event received with a sequence number less than that of the response can be ignored. Additionally, player status messages can be delivered on a separate channel than a channel used to send and/or receive commands. Thus event_sequence can become out of order relative to commands.

In some implementations, "state" can include a current state of the content and/or content streaming application. In some implementations, this can be represented by an integer from zero to two, such that: 0 corresponds to IDLE, 1 corresponds to STOPPED, and 2 corresponds to PLAYING. In some implementations, if "state" corresponds to IDLE, all fields except "sequence_number" and "error" can be ignored.

In some implementations, "active_input" can be a Boolean (e.g., true/false) field for indicating whether content that is being output by the device executing the content streaming application is being presented by a display coupled to the device executing the content streaming application. For example, "active_input" can indicate whether an HDMI input port of a television to which the device executing the content streaming application is coupled is the currently selected input of the television.

In some implementations, "content_id" can include a service-specific identifier of the content currently loaded by the content streaming application, which can be a free form string and can be specific to the content streaming application.

In some implementations, "title" can include a descriptive title of the content currently loaded by the content streaming application. In some implementations, the content streaming application can independently retrieve title information based on "content_id" or "title" given in a LOAD message.

In some implementations, "time_progress" can include an indication of whether the media time of the currently loaded content is progressing. In some implementations, if the value of "time_progress" is false, the computing device running the sender application can be instructed to stop extrapolating the media time. In some implementations, "time_progress" can be independent of "state" as the media time can stop in any state (e.g., due to an error, due to buffering, etc.).

In some implementations, "current_time" can include a current position of the content streaming application with respect to a beginning of the content, which can be given in seconds. If the content is live stream content, "current_time" can represent the time in seconds from the beginning of the live stream.

In some implementations, "duration" can include a representation of a duration of the currently playing content, which can be given in seconds. If the content is a live stream then this field can be set to null.

In some implementations, "volume" can include a current volume level, which can be indicated, for example, by a value between 0.0 and 1.0.

In some implementations, "content_info" can include a service specific object which can provide in-depth information about the current content. In some implementations, an initial value of "content_info" can be provided by the sender application in a LOAD message. In some implementations, the content streaming application can modify the content of "content_info" to provide information obtained by the content streaming application.

In some implementations, "identity" can include an automatically identified authentication token. This can be used when communication with external systems, such as a service provider content delivery network, a digital rights management server, and/or any other suitable outside system is performed. The authentication token can be used to identify the media receiving device running the receiver application when communicating with outside systems rather than an operating system identification or device identification token, which can, for example, enhance a privacy and security of the digital receiving device.

In some implementations, "error" can include a last error encountered by the media receiving device. If no error have been encountered, "error" can be set to null. Additionally, "error" can include an "Error Domain" that can be used to provide errors corresponding to individual applications, such as the receiver application, a content streaming application, etc.

In some implementations, multiple computing devices 112 can be used to send content to a common media playback device using the same or different content presentation applications. In such an implementation, media receiving device 102 can be configured to interrupt content that is currently being presented, add newly sent content to a queue to be presented after presentation of the content that is currently being presented, return a message indicating that display of the content has been inhibited, or any other suitable technique(s) for determining which content to present. In some implementations, settings of a content streaming application running on media receiving device 102 can determine whether to interrupt the currently presented content, add the new content item to a queue, refuse to accept the new content item, or any other technique(s) for determining which content to present.

Figure 4:
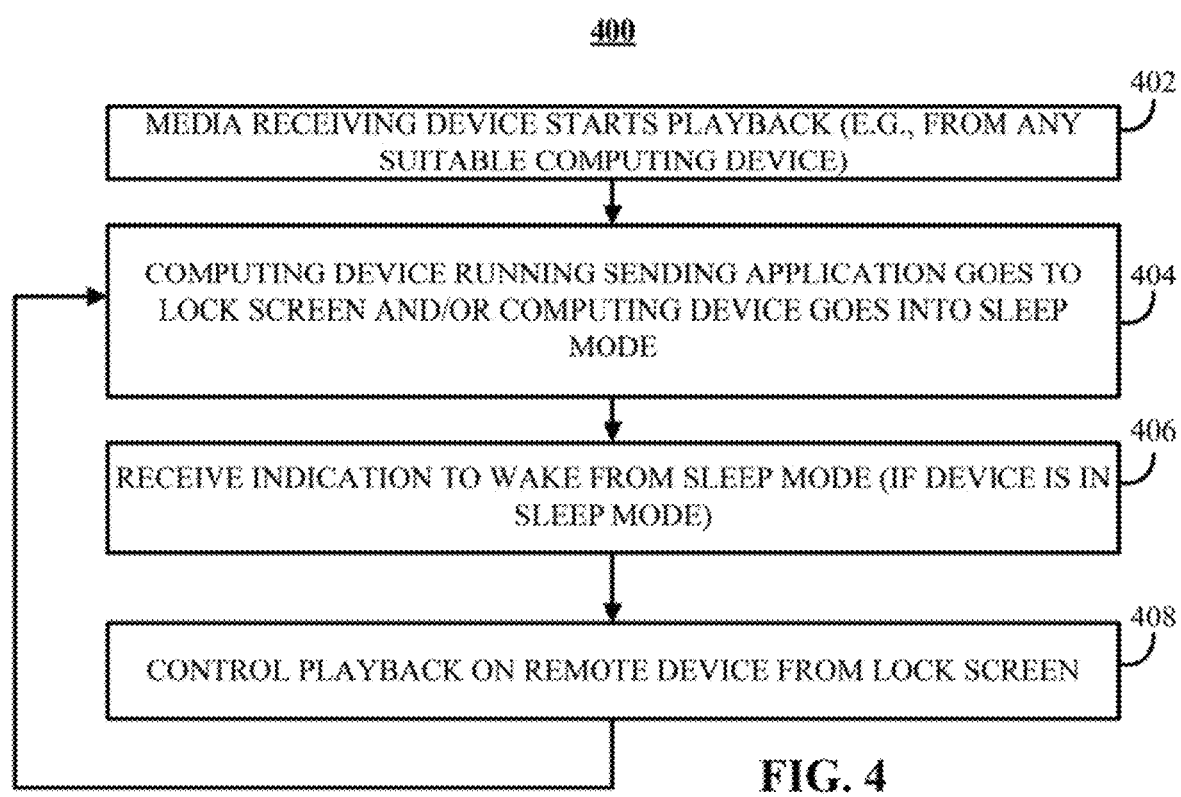
FIG. 4 shows an example of a process for generating commands to be sent to a media receiving device from a lock screen of a computing device in accordance with some implementations of the disclosed subject matter.

FIG. 4 shows an example 400 of a process for generating commands to be sent to a media receiving device from a lock screen of a computing device running the sender application in accordance with some implementations. At 402, a media receiving device (e.g., media receiving device 102) can cause content to be presented by starting playback of the content in response to a suitable command from a computing device (e.g., computing device 112).

At 404, computing device 112 running the sending application can go to a lock screen of the computing device, which can be a screen where a user has to perform an action to "unlock" the computing device prior to accessing some of the features of the computing device. Additionally or alternatively, computing device 112 can go into a "sleep mode" where the computing device can enter into a low power state (e.g., by turning off a display). In some implementations, a computing device can wake from a sleep mode in response to certain events such as receiving a message (e.g., a phone call, a text message, etc.), a particular user input (e.g., a button press on a particular button, a particular movement of the computing device by the user, etc.), and/or any other suitable event.

At 406, if computing device 112 is in a sleep mode, computing device 106 can receive an indication to wake from sleep mode, as described above.

At 408, computing device 112 can receive user inputs and the sender application can generate commands to send to media receiving device 102 in response to user inputs.

In some implementations, a second computing device that is not the same as a computing device that caused media content to be presented using a media receiving device can be coupled to the media receiving device and can control presentation of content on the media receiving device. For example, a second computing device can be coupled to a media receiving device that is being used to present content on a media playback device by selecting an icon for pairing with a media receiving device. A particular device can be chosen, and if the second computing device meets specified criterion (e.g., is on the same network, is allowed to be coupled to the media receiving device, the media receiving device is configured to accept control from multiple computing devices, etc.), the second computing device can be coupled and can control presentation of media content on the media receiving device.

In some implementations, a second computing device coupled to the media receiving device can be used to control certain properties of the presentation of the media content, for example, from a lock screen. Additionally, a second computing device that does not have the particular content presentation application used to present the content item can nevertheless be used to control aspects of the presentation of the content item, such as play/pause, volume, seek, etc., but may be inhibited from discovering and/or browsing for additional media content items.

Figure 5A:
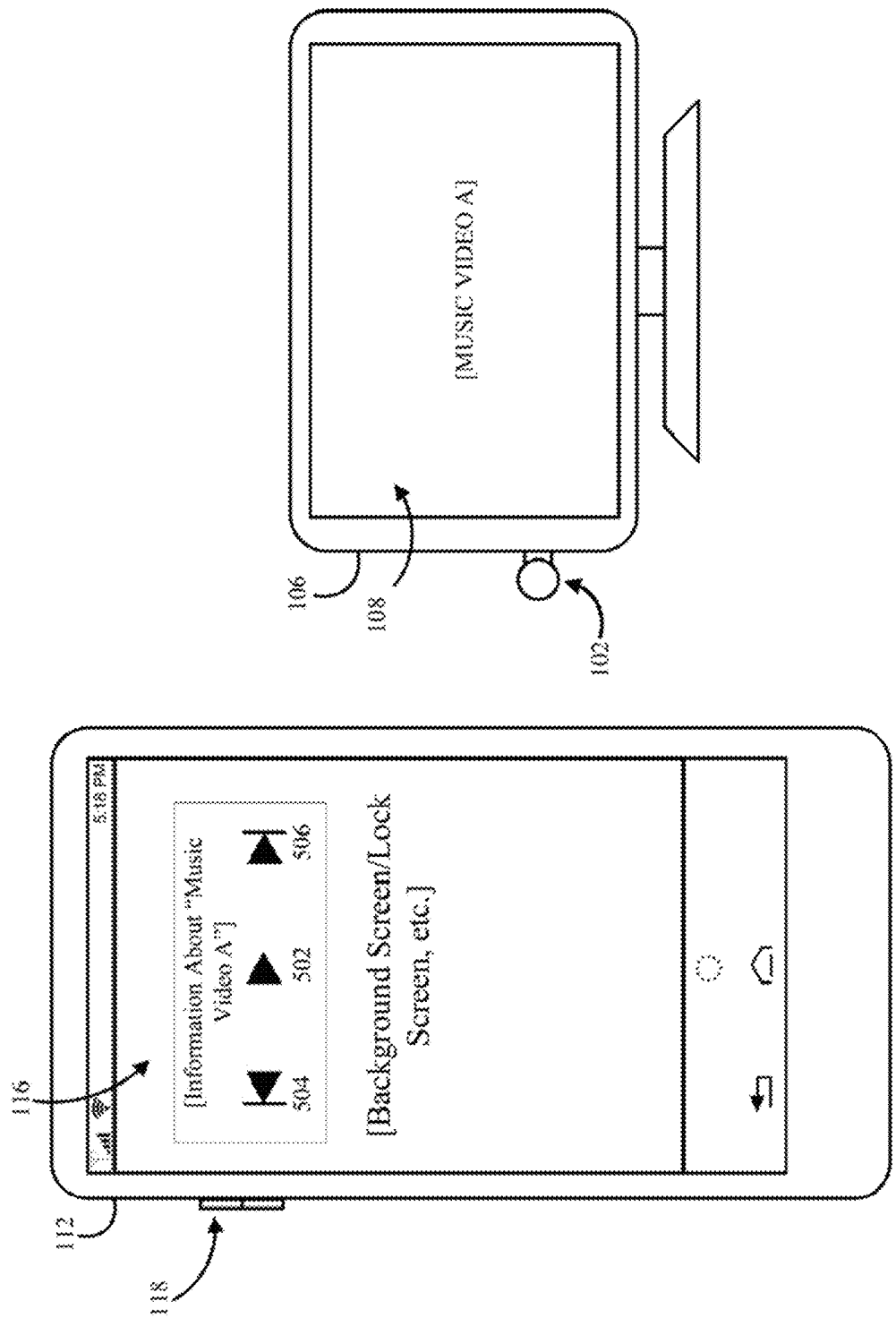
FIGS. 5A-5B show examples of a lock screen user interface for controlling a media receiving device in accordance with some implementations.

FIG. 5A shows an example of a lock screen user interface in accordance with some implementations. In the example shown in FIG. 5A computing device 112 has caused media receiving device 102 to present a media content item to be presented on display 108 of media playback device 106. In some implementations, in a lock screen of computing device 112 running the sending application, information can be presented to the user regarding identification of media content being presented, which can include title information, episode information, etc. The lock screen can also include controls 502-506 for controlling playback of the media content item on media playback device 106. For example, the lock screen can contain a play icon 502 which can be used to control whether to play or pause (or stop) presentation of the media content item, a seek back or previous track icon 504 and a seek forward or next track icon 506 which can be used to control such behavior. In some implementations, if computing device 112 detects a user input to one of controls 502-506, the sender application can formulate a corresponding command which can be sent over the channel established between computing device 112 and media receiving device 102. Media receiving device 102 can receive the command using the receiver application and the content streaming application that is causing content to be presented can control presentation of the content in response to the received command.

In some implementations, the lock screen can include other user interface items and/or information, such as a scrubber (e.g., a bar indicating a progress time of the media content) which can be used to play the media content from a particular location, a preview function which can present a user with a screen shot of the content at a time indicated by user selection of a particular time using the scrubber, an identification of the media receiving device that is being used to present the content identified by the title presented on the lock screen, and/or any other suitable information or interface items.

Figure 5B:
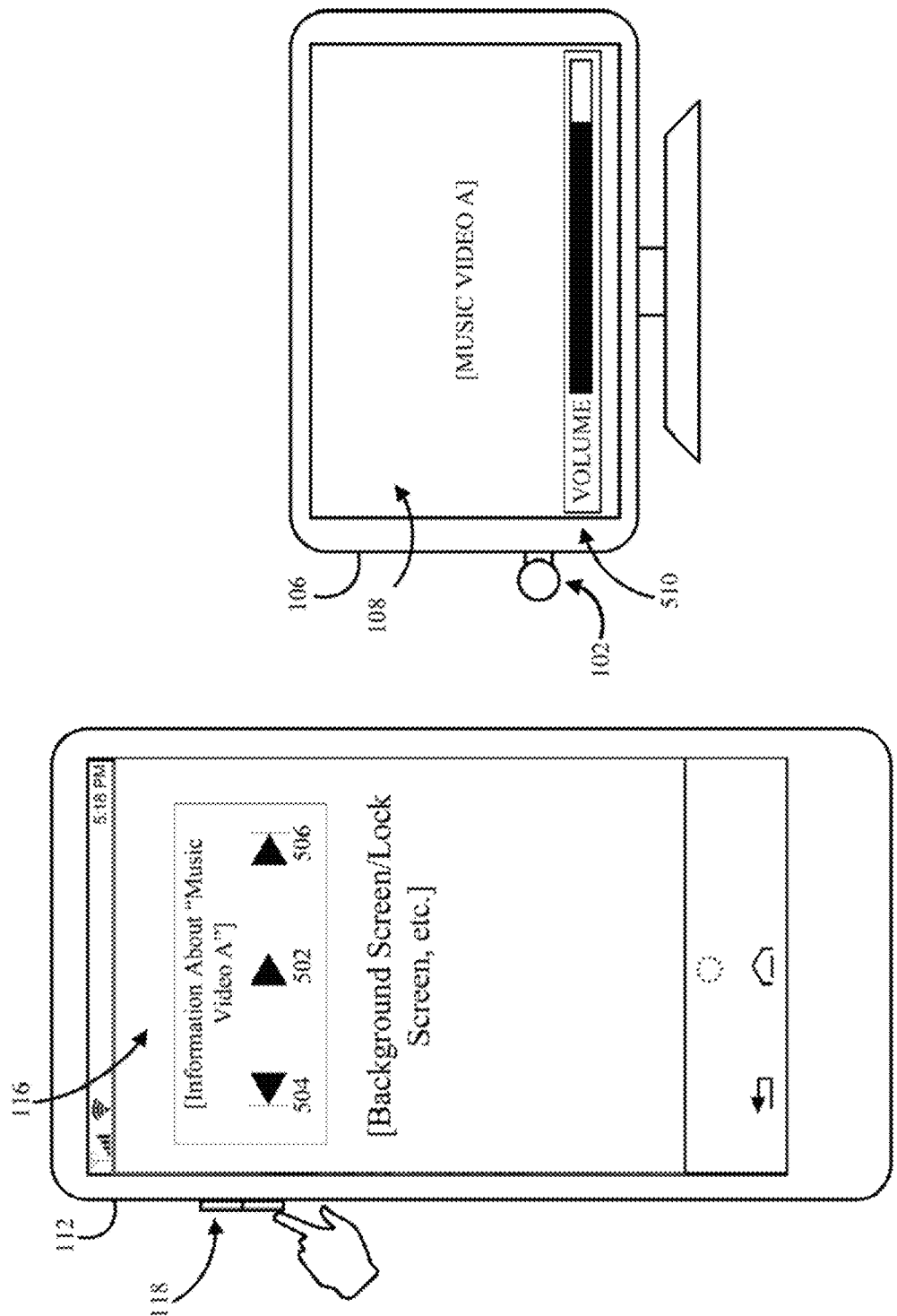

FIG. 5B shows an example of control of volume from a lock screen of a computing device in accordance with some implementations of the disclosed subject matter. In the example shown in FIG. 5B, computing device 112 in a lock screen can detect activation of volume control 118, for example in response to a user pressing volume control 118. In some implementations, in response to computing device 112 detecting activation of volume control 118 in a lock screen during presentation of media content using media receiving device 102, the sender application can send a command to change the volume to media receiving device as a VOLUME command. The specified volume can change a predetermined amount for each activation of volume control 118 (e.g., volume can be changed by 0.1 for each press). In some implementations, media receiving device 102 can cause an output volume to be changed in response to the receiver application receiving the VOLUME command, and can cause a current volume 510 to be presented on display 108 of media playback device 106.

Figure 6:
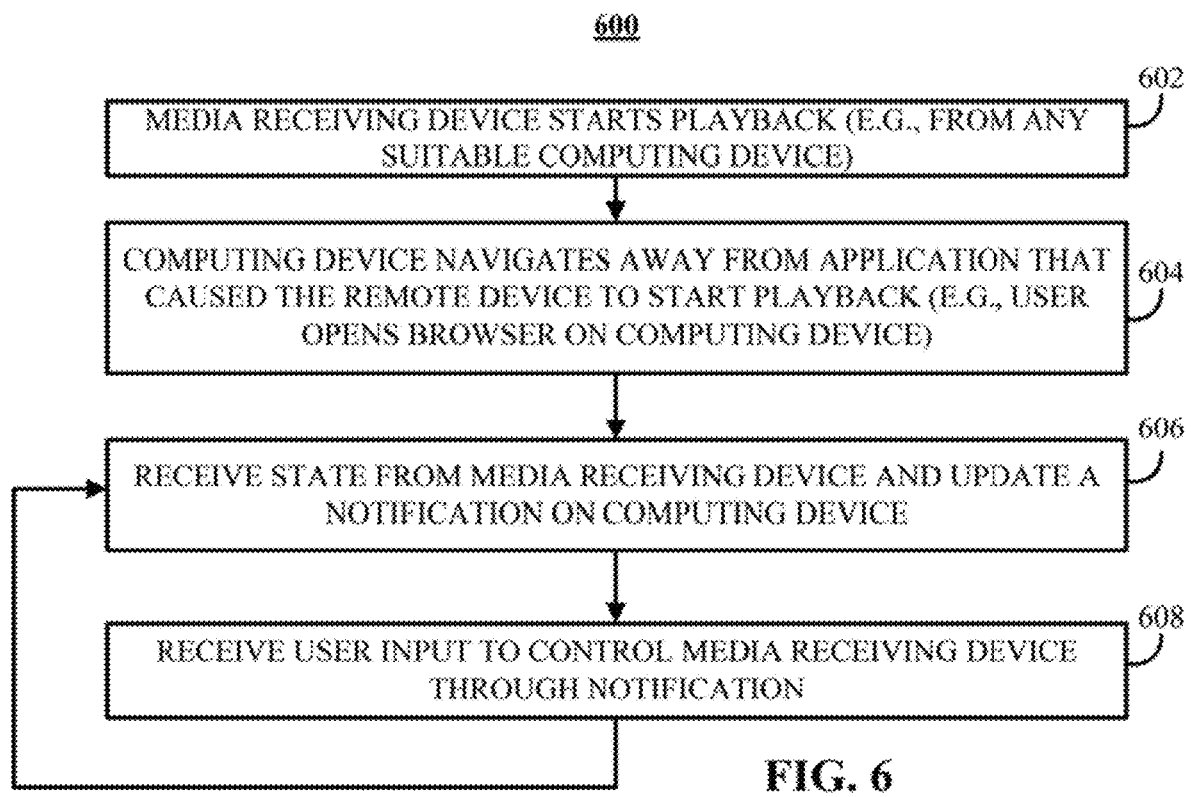
FIG. 6 shows an example of a process for controlling presentation of a media content item from a notification provided on a computing device in accordance with some implementations of the disclosed subject matter.

FIG. 6 shows an example 600 of a process for controlling presentation of a media content item from a notification provided on a computing device in accordance with some implementations. At 602, a media receiving device (e.g., media receiving device 102) can cause content to be presented by starting playback of the content in response to a suitable command from a computing device (e.g., computing device 112).

At 604, computing device 112 that caused the content to be presented can navigate away from the content presentation application that was used to initiate presentation of the content. For example, a Web browser application may be opened by computing device 112 in response to a user instructing computing device 112 to open the Web browser application. As another example, the content presentation application can be minimized or put into a background mode in response to a user navigating to a home screen of computing device 112.

At 606, the sender application running on computing device 112 can receive a state of content being presented using media receiving device 102. In response to receiving the status of the content, the sender application and/or the content presentation application which can be running, for example, in a background state, can create and/or update a notification related to the state of the content. In some implementations, computing device 112 can place such a notification in a notification center or notification page which can be accessed by receiving a predetermined input.

At 608, computing device 112 can receive an input to control presentation of the content through the notification that was created and/or updated at 606. For example, computing device can open a notification page in response to receiving the predetermined input and can receive further input corresponding to a particular command. More particularly, an input can be received that can correspond to a pause command, and the sender application can generate a pause command in response to receiving such an input at the notification. As another example, an input can be received that can correspond to an instruction to open the content presentation application.

FIGS. 7A-7F show an example of using the mechanisms described herein for presenting content used with computing device 112, which can include at least a portion of each of process 200 and process 400 in accordance with some implementations of the disclosed subject matter.

Figure 7A:
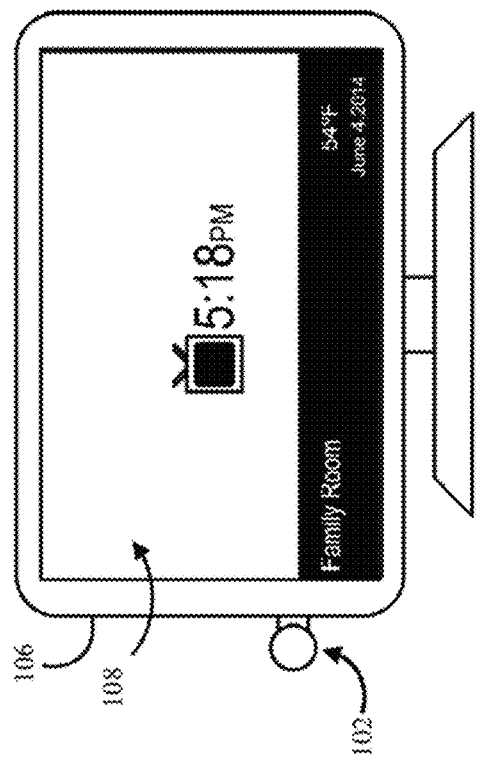
FIGS. 7A-7F show an example of using the mechanisms described herein for presenting content used with a computing device in accordance with some implementations of the disclosed subject matter.
Figure 7A:
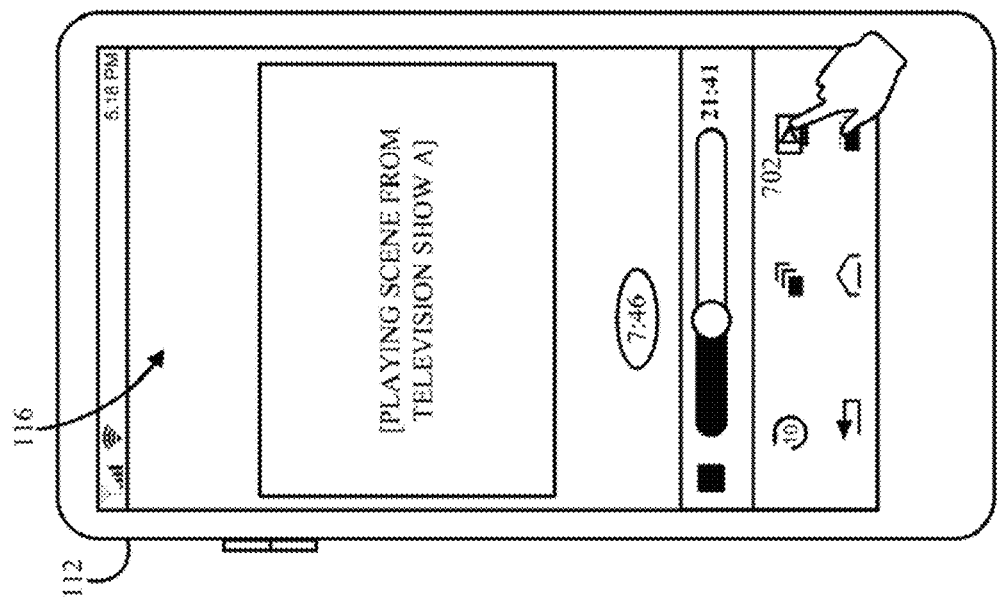

FIG. 7A shows an example of computing device 112 being used to present a media content item using display 116. In the example shown in FIG. 7A, the media content item can be an episode of a television series being presented using a content presentation application that allows a user to access a service that facilitates streaming of movies and television shows for playback on various devices. A user interface of the content presentation application can include an icon 702 that causes a sender application and/or the content presentation application running on computing device 112 to initiate mechanisms for causing the content being presented on display 116 to be presented using a media receiving device, such as media receiving device 102. In some implementations, if an input corresponding to media receiving device 102 (e.g., the HDMI port that media receiving device is plugged into) is selected on media playback device 106 while a content item is not being presented by media receiving device 102, a default screen can be presented by media receiving device 102.

Figure 7B:
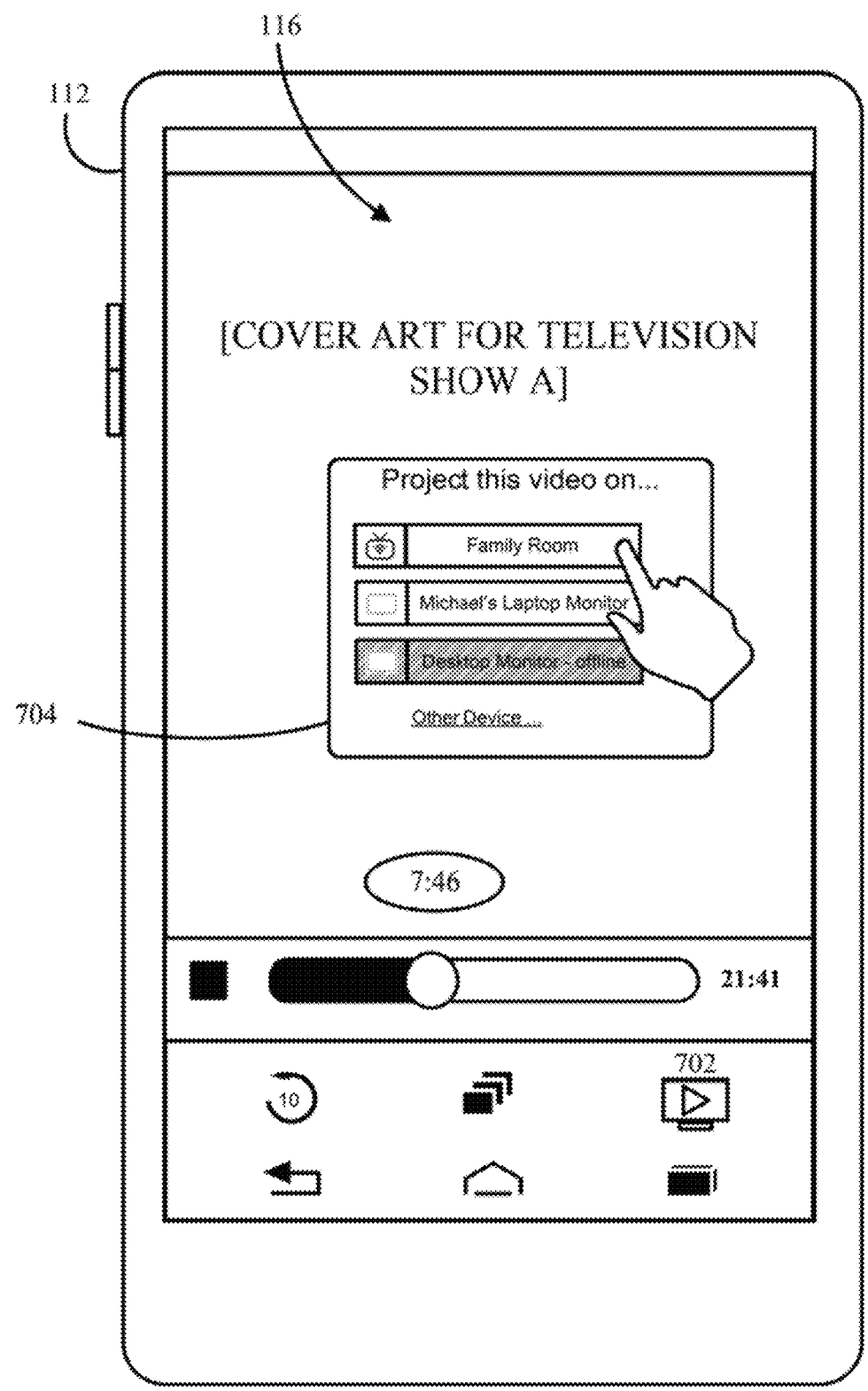

FIG. 7B shows an example of a user interface that can be presented by the sender application in response to computing device 112 receiving an input corresponding to a selection of icon 702. In the example shown in FIG. 7B, the sender application can present a list 704 of media receiver devices which can cause the selected media content item (e.g., the television show being presented on display 116 in FIG. 7A) to be presented. In some implementations, when list 704 is presented, playback of the media content item can be paused or otherwise inhibited pending a user selection. Alternatively, list 704 can be presented during playback of the media content item by computing device 112.

Figure 7C:
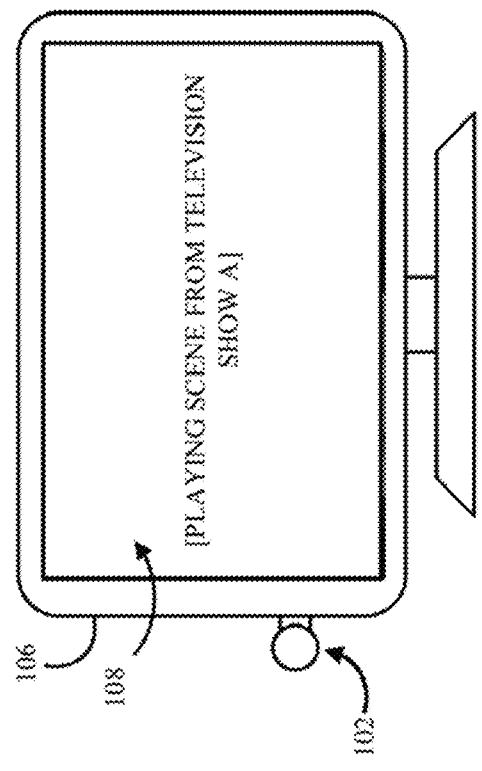
Figure 7C:
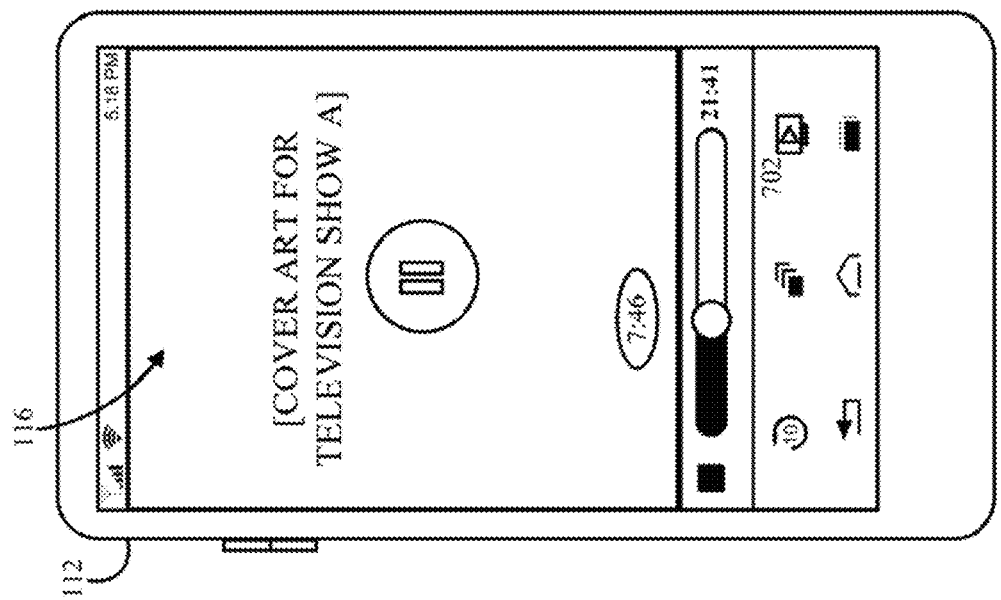

FIG. 7C shows an example of the media content item being presented by media receiving device 102 on display 108 of media playback device 106, while the content presentation application is active on computing deice 112. In some implementations, information related to the media content can be presented on computing device 112 while the content it being presented using media receiving device 102.

Figure 7D:
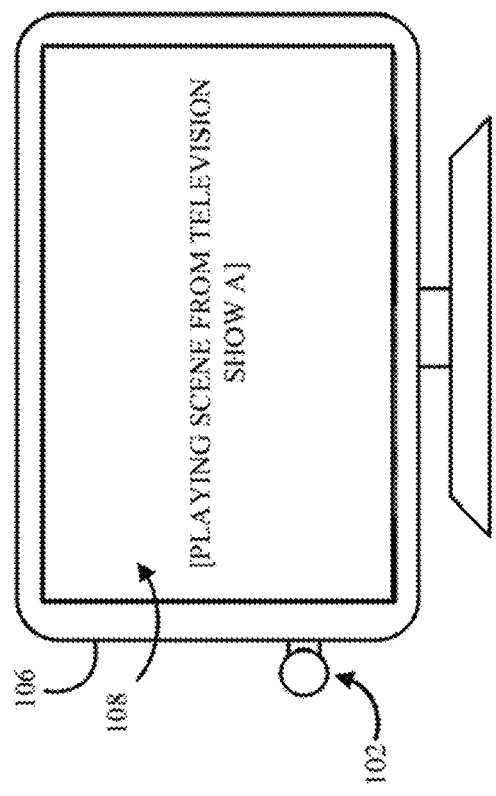
Figure 7D:
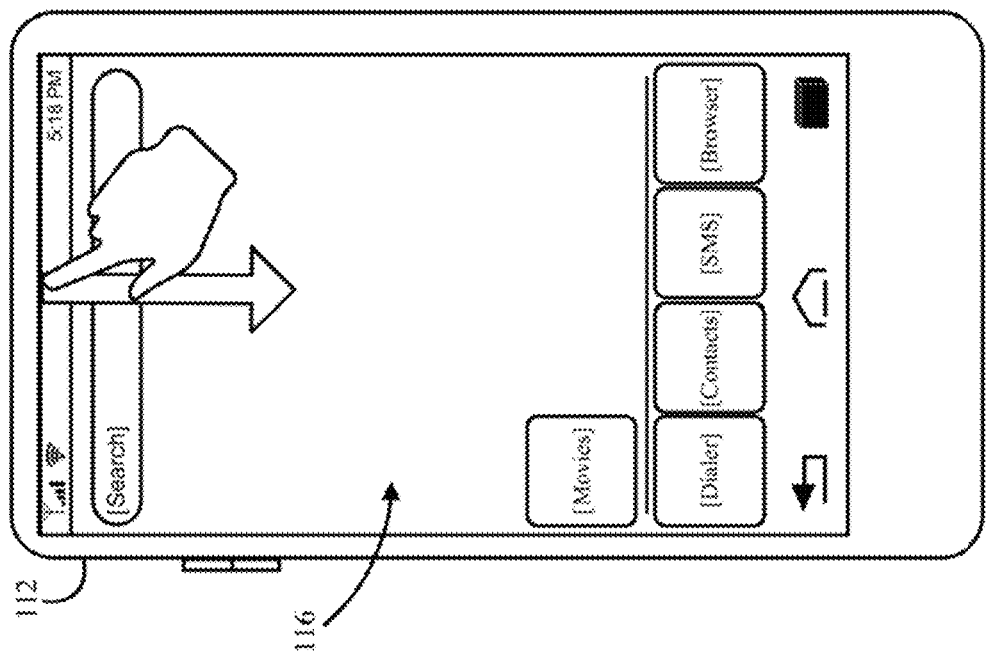

FIG. 7D shows an example of the media content item being presented by media receiving device 102 on display 108 of media playback device 106 while computing device 112 is at a home screen. In some implementations, a user can perform a predetermined action, such as a swipe from a top bezel of a touchscreen of computing device 112 to navigate to a notification screen.

Figure 7E:
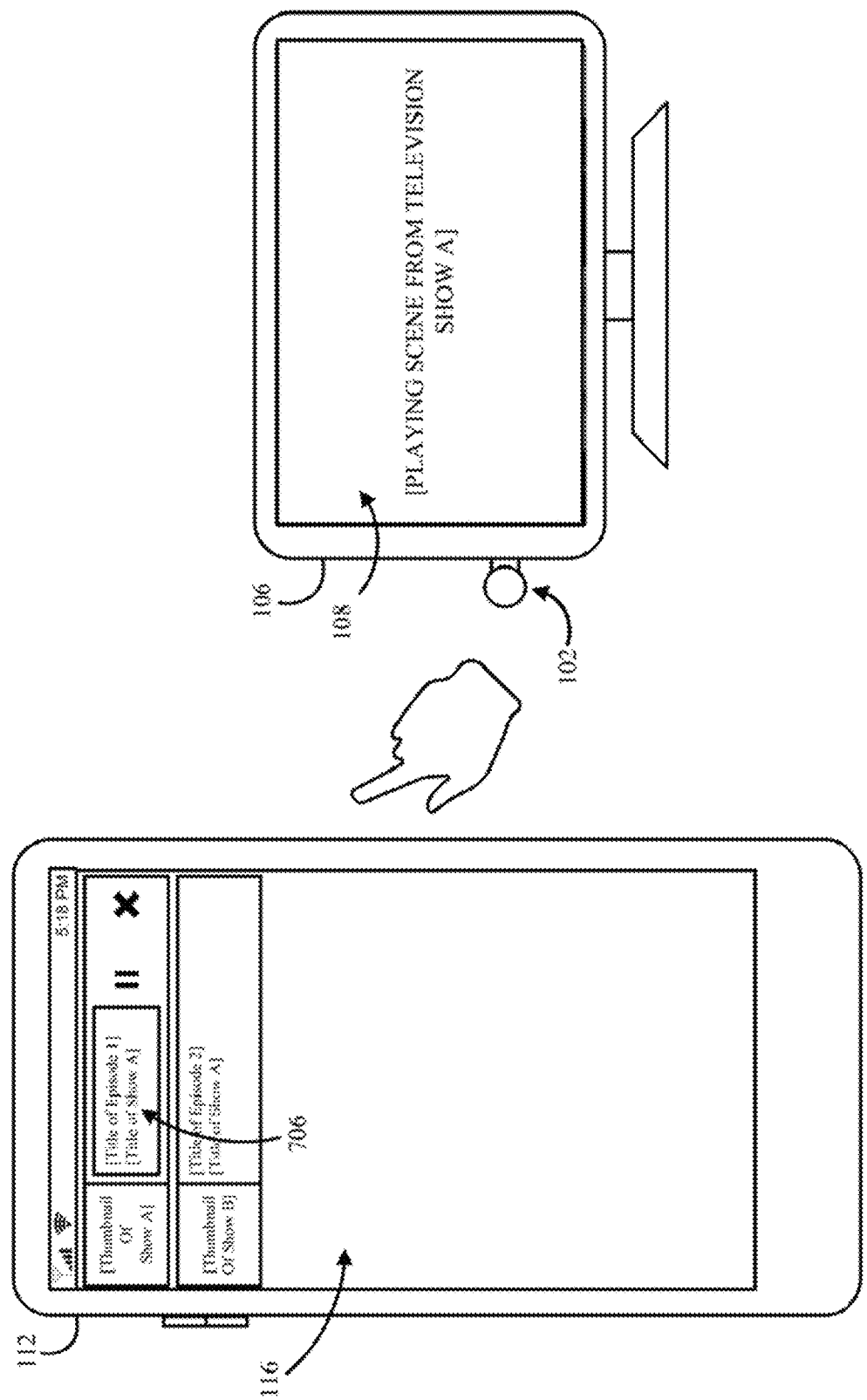

FIG. 7E shows an example of the media content item being presented by media receiving device 102 on display 108 of media playback device 106 while computing device 112 is at a notification screen. As described above in connection with FIG. 6, a notification 706 can be created that corresponds to the media content item being presented using media receiving device 102, and notification 706 can be used to control presentation of the media content by media presentation device 102, by for example, receiving an indication that a pause icon has been selected.

Figure 7F:
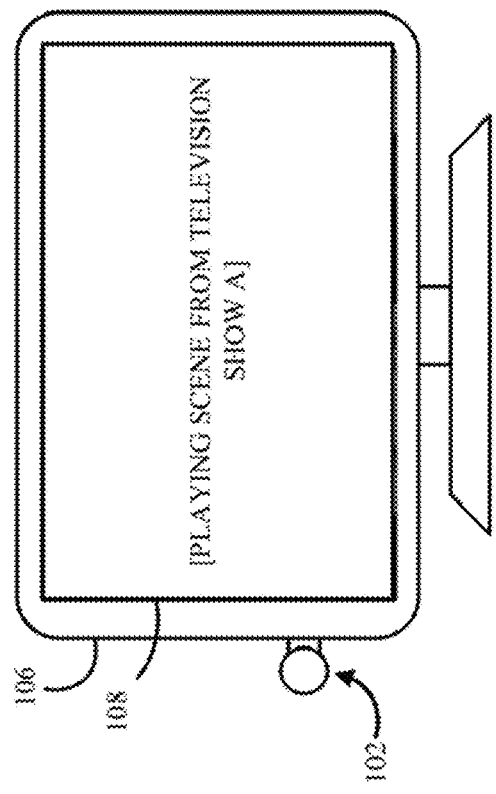
Figure 7F:
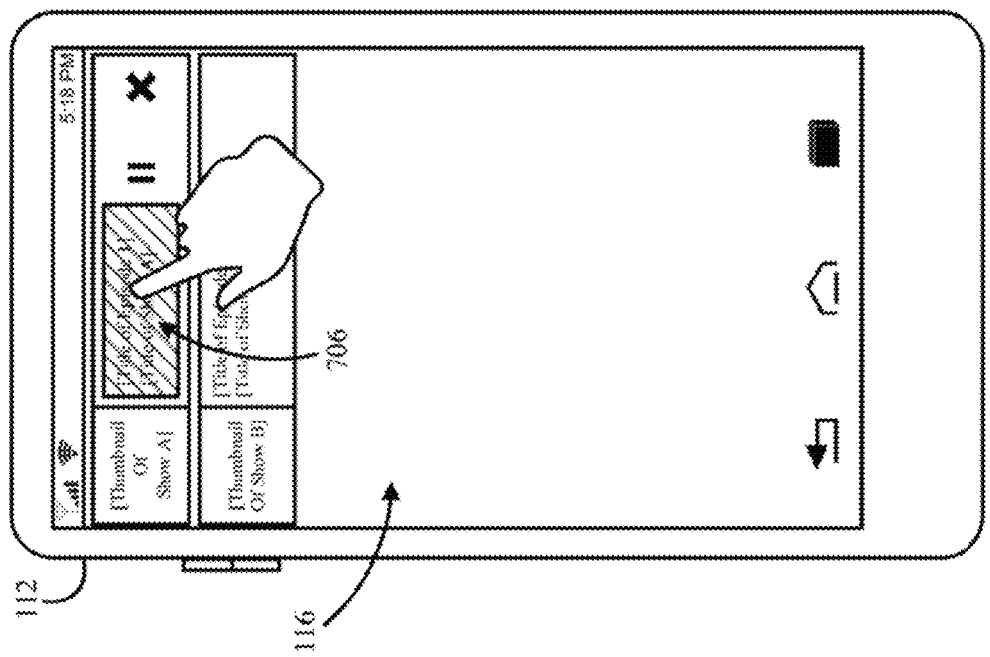

FIG. 7F shows an example in which a user is selecting an icon corresponding to the media content being displayed. Selection of such an icon can cause computing device 112 to navigate to the content presentation application, for example as shown in FIG. 7C.

In some implementations, information such as a show title, episode title, cover art, etc. can be displayed in such a notification as shown in, for example, FIGS. 7E and 7F.

FIGS. 8A-8E show an example of using the mechanisms described herein for presenting content used with a computing device running a browser that includes the sender application, which includes at least a portion of each of process 200 and process 400 in accordance with some implementations of the disclosed subject matter.

Figure 8A:
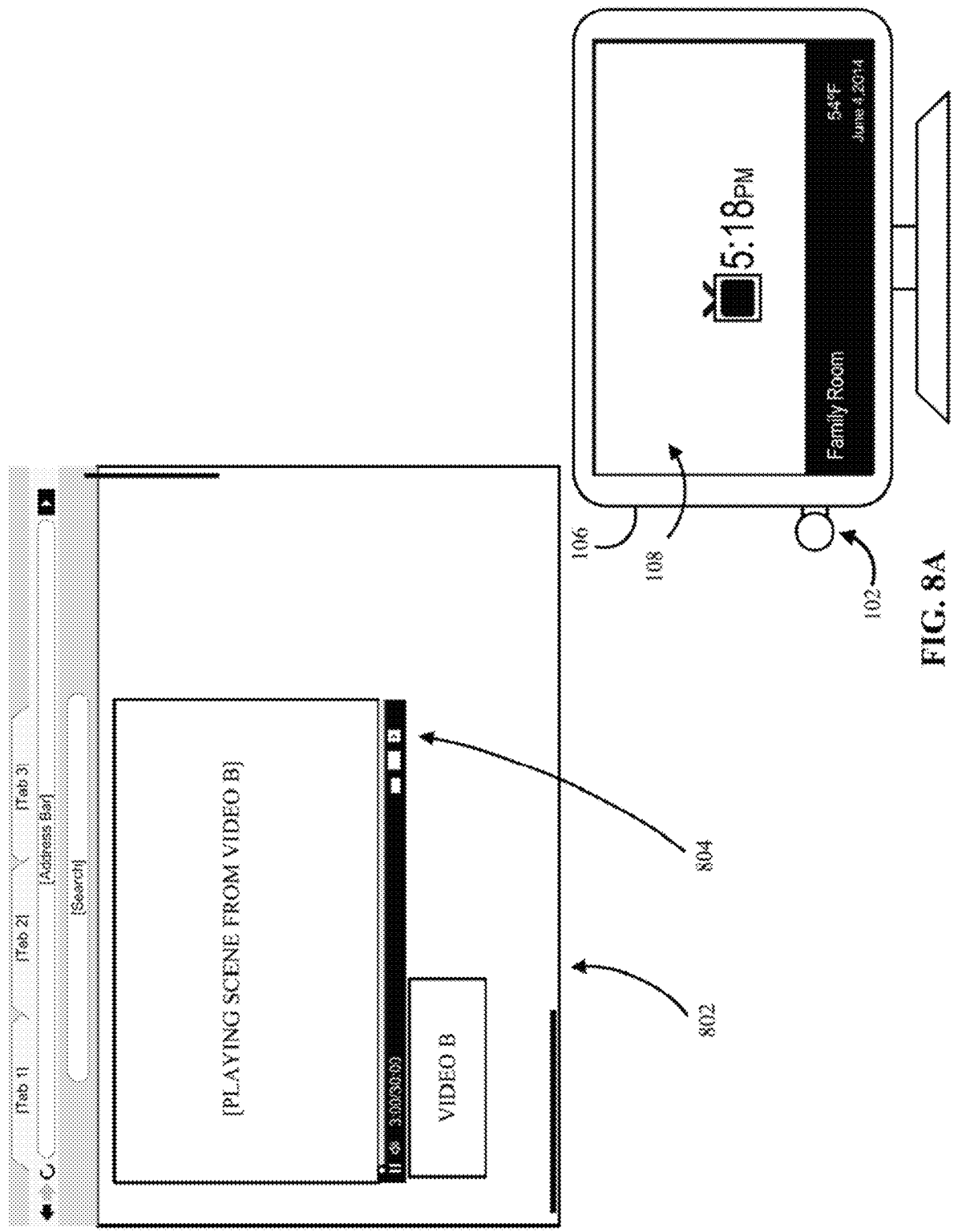

FIG. 8A shows an example of a browser 802 being used to present a media content item. In the example shown in FIG. 8A, the media content item can be a video available to users of a video sharing service presented using a Web page of the video sharing service that allows a user to access videos made available by the video sharing service. A user interface of the Web page can include an icon 804 that causes a sender application and/or browser 802 to initiate mechanisms for causing the content being presented in the Web page to be presented using a media receiving device, such as media receiving device 102. In some implementations, if an input corresponding to media receiving device 102 (e.g., the HDMI port that media receiving device is plugged into) is selected on media playback device 106 while a content item is not being presented by media receiving device 102, a default screen can be presented by media receiving device 102, as shown in FIG. 8A.

Figure 8B:
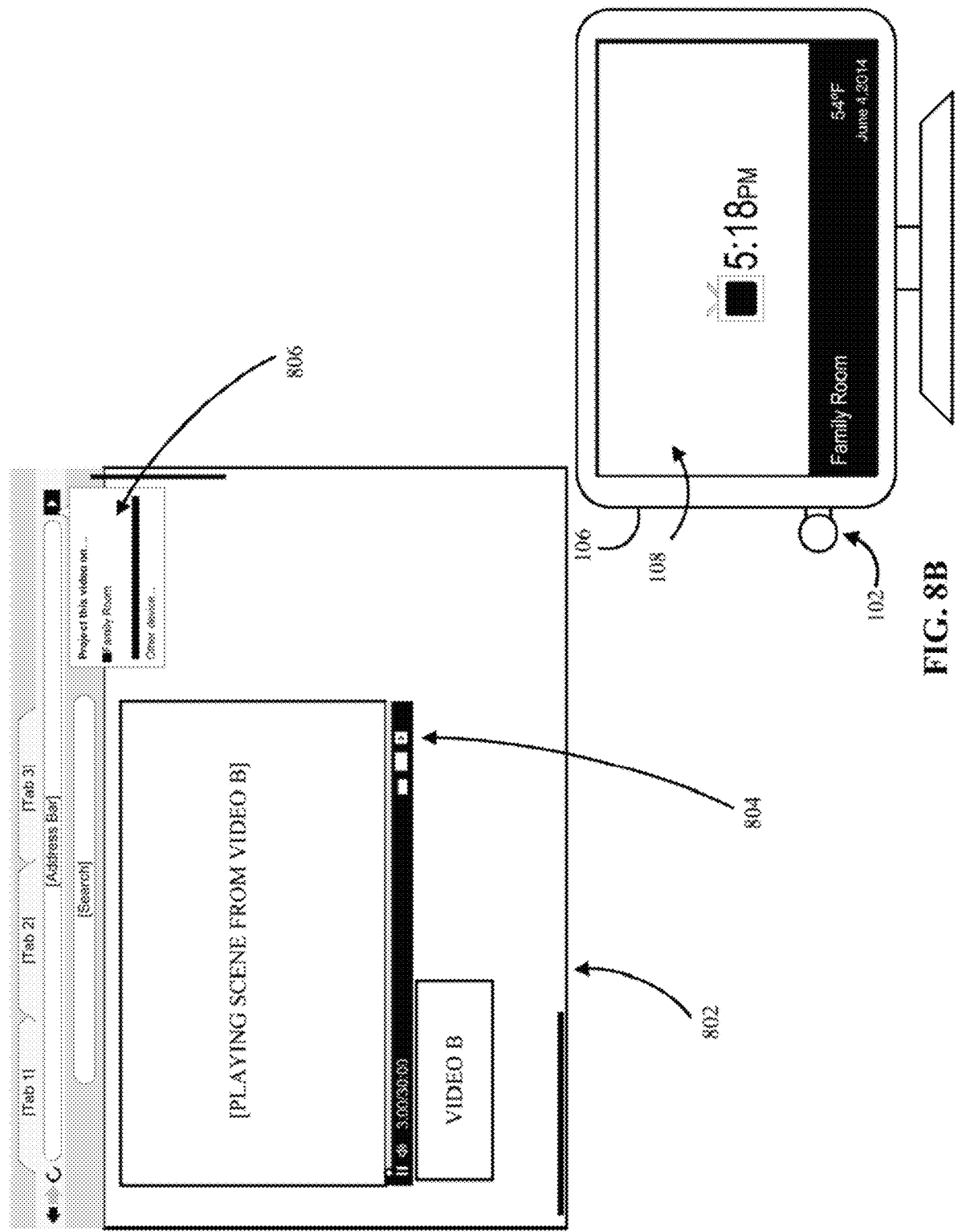
Figure 8C:
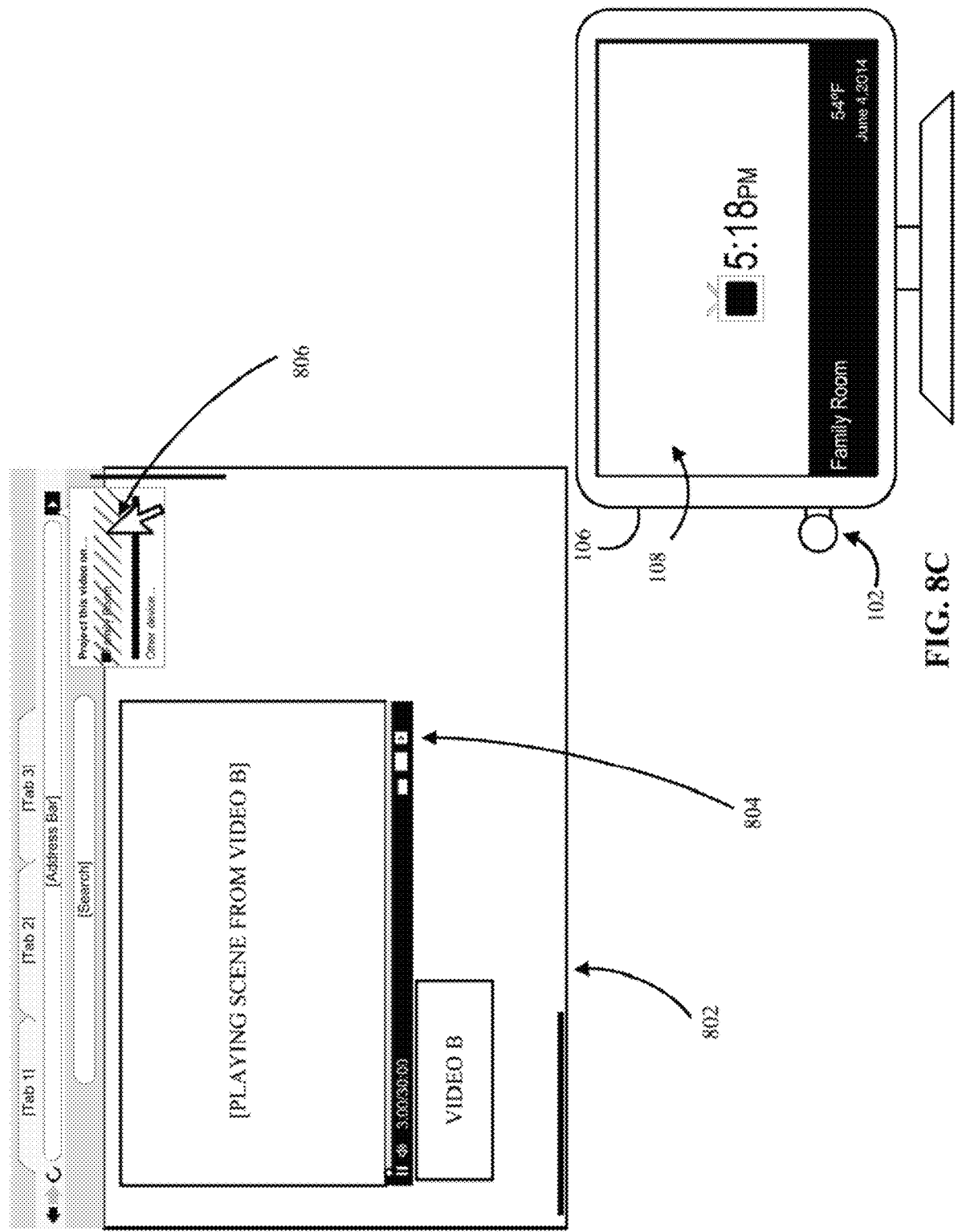

FIG. 8B shows an example of browser 802 after a selection of icon 804 is received, where a list 806 of media receiver devices which can cause the selected media content item (e.g., the video being played in FIG. 8B) to be presented. Additionally or alternatively, in some implementations, list 806 can be presented as a drop-down list from icon 804 after selection of icon 804, and/or list 806 can be presented as a drop-down from the title bar (e.g., as shown in FIG. 8B) in response to selection of the icon in the title bar. In some implementations, FIG. 8C shows a cursor selecting a media receiving device in list 806 that corresponds to media receiving device 102 connected to media playback device 106.

Figure 8D:
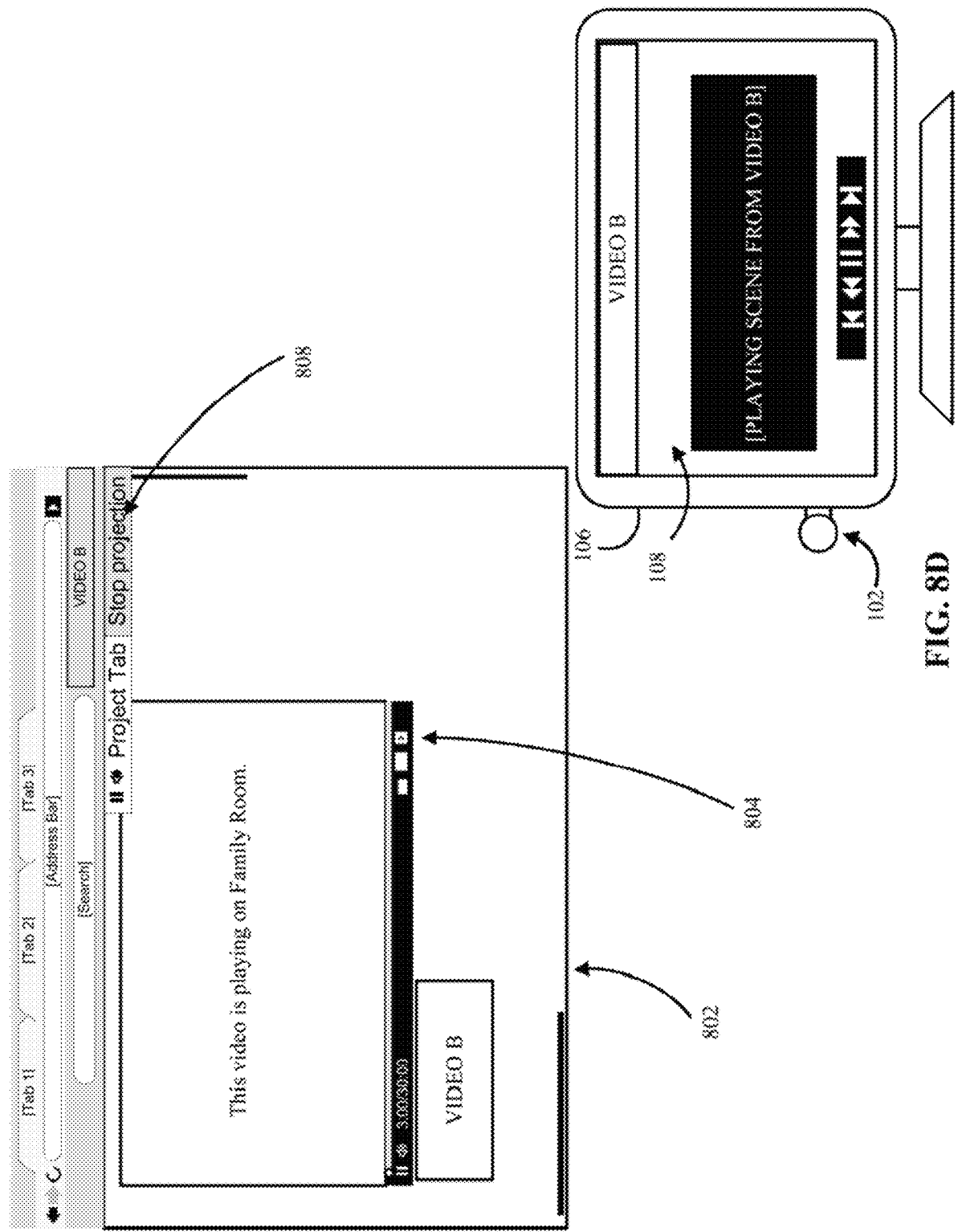

FIG. 8D shows an example of the video that was being presented in browser 802 being presented by media receiving device 102 on display 108 of media playback device 106. In some implementations, when the media content item is being presented by media playback device 102 a message indicating such can be presented in place of the video in browser 802. Additionally, controls 808 for controlling presentation by media receiving device 102 can be presented to a user by browser 802. In some implementations, when a media content item is initially presented by a media receiving application, e.g., on display 108, information identifying the media content item such as a title, etc., can be presented as an overlay or the like.

FIG. 8E shows an example in which the video that was being presented on browser 802 is being presented in a full screen mode on display 108.

Figure 9:
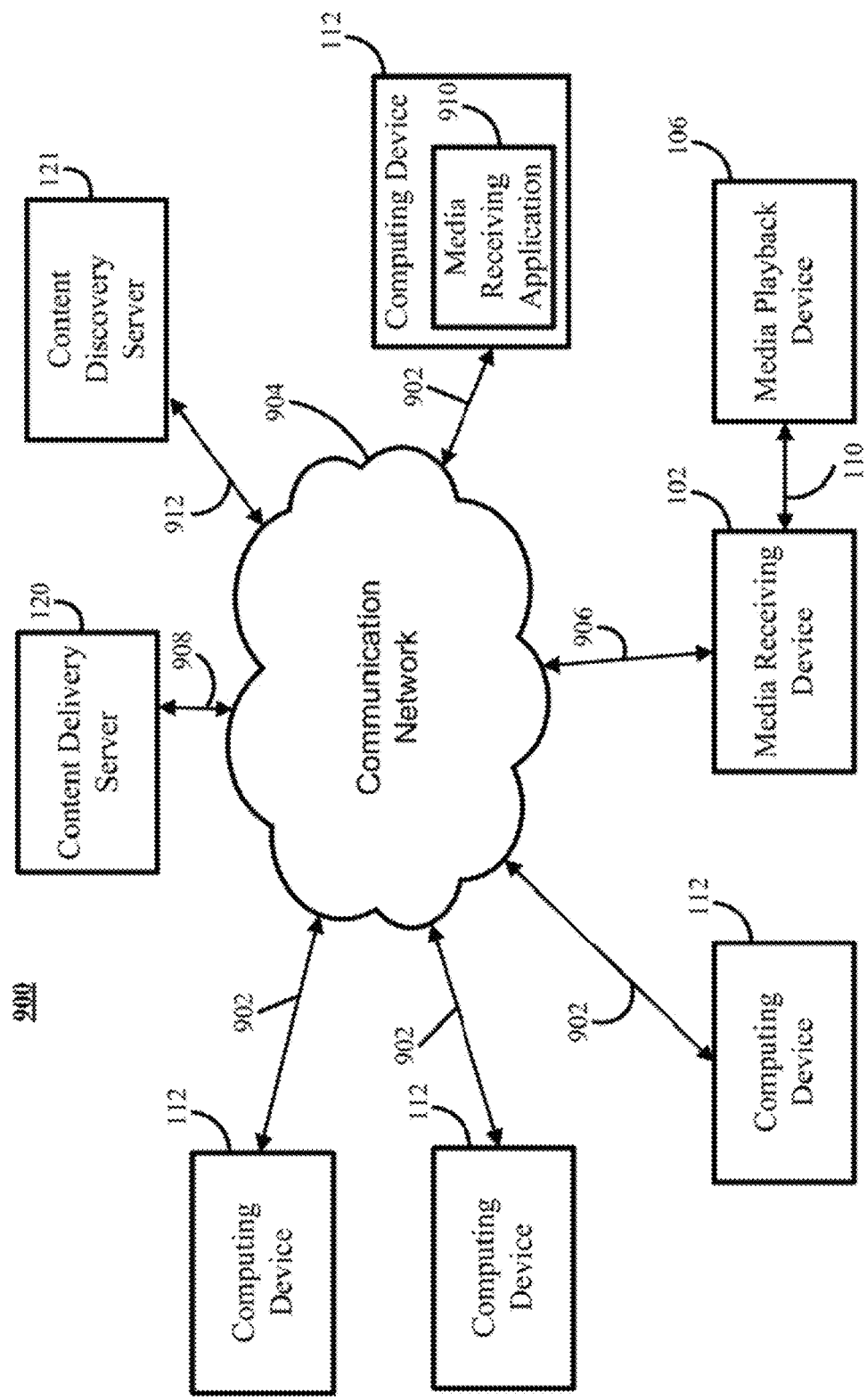
FIG. 9 shows an example of a generalized schematic diagram of a system on which the mechanisms for presenting content as described herein can be implemented in accordance with some implementations of the disclosed subject matter.

FIG. 9 shows an example 900 of a generalized schematic diagram of a system on which the mechanisms for presenting content as described herein can be implemented in accordance with some implementations. As illustrated, system 900 can include one or more computing devices 112. Computing devices 112 can be local to each other or remote from each other. Computing devices 112 can be connected by one or more communications links 902 to a communications network 904 that can be linked via a communications link 906 to media receiving device(s) 102, via a communication link 908 to content delivery server 120, via communication link 912 to content discovery server 121, and via communication links 902 to other computing devices 112.

In some implementations, each of the computing devices 112, content delivery server 120, content discovery server 121, and media receiving device 102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 112 can be implemented as a smartphone, a tablet computer, a wearable computer, a personal computer, a laptop computer, a gaming console, a digital media receiver, a set-top box, a smart television, a server, etc.

Communications network 904 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 902, 906, 908, and 912 can be any communications links suitable for communicating data among computing devices 112, media receiving device 102, content delivery server 120, and content discovery server 121, such as network links, dial-up links, wireless links, hard-wired links, any other suitable communications links, or any suitable combination of such links. Computing devices 112 can discover, browser, download, stream, store, playback, transmit, and/or otherwise present content stored locally at computing device 112 or stored remotely at content delivery server 120 using any suitable technique(s).

System 900 can include media receiving device 102 as described above in connection with, for example, FIG. 1, and can include a media receiving application 910 installed on and/or running on one or more of computing devices 112, which can replicate the functions of media receiving device 102 using a computing device 112.

System 900 can include one or more content delivery servers 120. Content delivery server 120 can be any suitable server for providing access to media content items in accordance with the mechanisms described herein for presenting content, such as a processor, a computer, a data processing device, and/or any suitable combination of such devices.

System 900 can include one or more content discovery servers 121. Content discovery server 121 can be any suitable server for facilitating discovery and/or browsing of media content items accessible on content delivery server 120 in accordance with the mechanisms described herein for presenting content, such as a processor, a computer, a data processing device, and/or any suitable combination of such devices.

In some implementations, communications link 114 described above in connection with FIG. 1 can include communication link 902, communication network 904, and communication link 906; communications link 122 described above in connection with FIG. 1 can include communication link 902, communication network 904, and communication link 908; and communications link 124 described above in connection with FIG. 1 can include communication link 906, communication network 904, and communication link 908.

Figure 10:
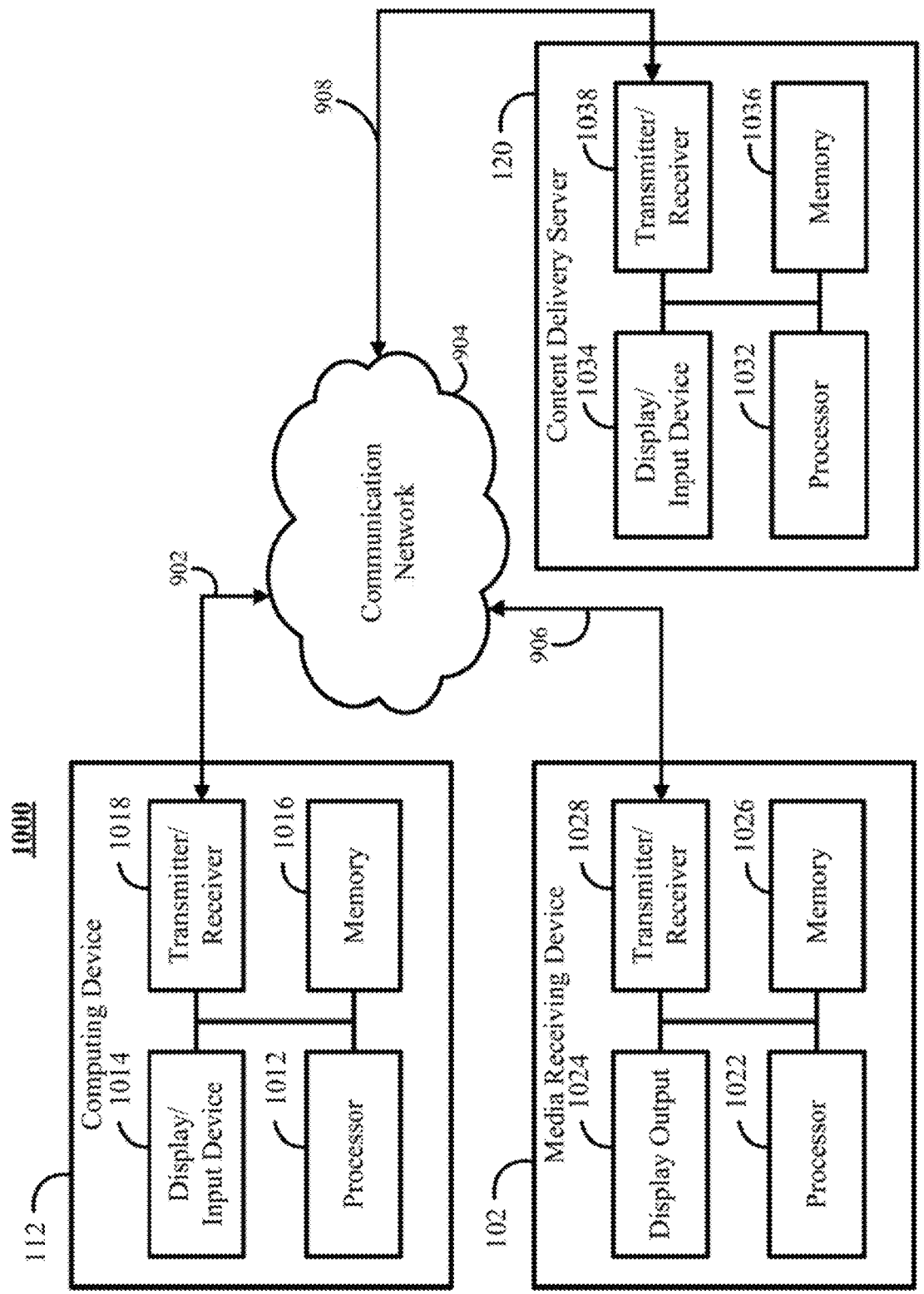
FIG. 10 shows an example of hardware that can be used to implement a computing device, a media receiving device, and a content delivery server depicted in FIG. 9 in accordance with some implementations of the disclosed subject matter.

FIG. 10 shows an example 1000 of hardware that can be used to implement one of computing devices 112, media receiving device 102, and content delivery server 120 depicted in FIG. 9 in accordance with some implementations of the disclosed subject matter. Referring to FIG. 10, computing device 112 can include a hardware processor 1012, a display/input device 1014, memory 1016, and a transmitter/receiver 1018, which can be interconnected. In some implementations, memory 1016 can include a storage device (such as a non-transitory computer-readable medium) for storing a computer program for controlling hardware processor 1012.

Hardware processor 1012 can use the computer program to present on display/input device 1014 media content and/or an interface that allows a user to, among other things, cause media content presented on display/input device 1014 to be presented on a media receiving device, such as media receiving device 102. It should also be noted that data received through communications link 902 or any other communications links can be received from any suitable source. In some implementations, hardware processor 1012 can send and receive data through communications link 902 or any other communication links using, for example, a transmitter, receiver, transmitter/receiver, transceiver, or any other suitable communication device, such as transmitter/receiver 1018. Display/input device 1014 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 1018 can include any suitable transmitter and/or receiver for transmitting and/or receiving, among other things, media content including audio and/or video content.

Media receiving device 102 can include a hardware processor 1022, a display output 1024, memory 1026, and a transmitter/receiver 1028, which can be interconnected. In some implementations, memory 1026 can include a storage device (such as a non-transitory computer-readable medium) for storing a computer program for controlling hardware processor 1022.

Hardware processor 1022 can use the computer program to provide media content and/or a user interface to display output 1024 for presenting the media content and/or user interface on a media playback device. It should also be noted that data received through communications link 906 or any other communications links can be received from any suitable source. In some implementations, hardware processor 1022 can send and receive data through communications link 906 or any other communication links using, for example, a transmitter, receiver, transmitter/receiver, transceiver, or any other suitable communication device, such as transmitter/receiver 1028. Display output 1024 can include hardware, software and/or firmware for outputting media content to a media playback device in any suitable format, and can include input/output connector 104 as described above in connection with FIG. 1. Transmitter/receiver 1028 can include any suitable transmitter and/or receiver for transmitting and/or receiving, among other things, media content including audio and/or video content.

Content delivery server 120 can include a hardware processor 1032, a display/input device 1034, memory 1036, and a transmitter/receiver 1028, which can be interconnected. In some implementations, memory 1036 can include a storage device for storing data received through communications link 908 or through other links. The storage device (such as a non-transitory computer-readable medium) can further include a server program for controlling hardware processor 1032.

Hardware processor 1032 can use the server program to communicate with computing device 112 and/or media receiving device 102, as well as provide access to media content. It should also be noted that data received through communications link 908 or any other communications links can be received from any suitable source. In some implementations, hardware processor 1032 can send and receive data through communications link 908 or any other communication links using, for example, a transmitter, receiver, transmitter/receiver, transceiver, or any other suitable communication device, such as transmitter/receiver 1038. In some implementations, hardware processor 1032 can receive commands and/or values transmitted by one or more users. Display/input device 1034 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 1018 can include any suitable transmitter and/or receiver for transmitting and/or receiving, among other things, media content including audio and/or video content.

In some implementations, content delivery server 120 can be implemented in one servers or can be distributed as any suitable number of servers. For example, multiple servers 120 can be implemented in various locations to increase reliability and/or increase the speed at which server 120 can communicate with computing devices 112 and/or media receiving device 102.

In some implementations, content discovery server 121 can be implemented using similar hardware to content delivery server 120, but can include a server program for facilitating discovery and/or browsing of media content items accessible from content delivery server 120.

In one particular implementation, the mechanisms described herein including the sender application, the receiver application, the content presentation application, and/or the content streaming application can include server-side software, server-side hardware, client-side software, client-side hardware, or any suitable combination thereof. For example, the sender application, the receiver application, the content presentation application and/or the content streaming application can encompass a computer program written in a programming language recognizable by hardware processor 1012, hardware processor 1022, and/or hardware processor 1032 (e.g., a program written in a programming language, such as, Java, C, Objective-C, C++, C#, Javascript, Visual Basic, or any other suitable approaches). As another example, the sender application, the receiver application, the content presentation application and/or the content streaming application can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 2-8 can be executed or performed in any order or sequence not limited to the order and sequence shown and described in the figures. Also, some of the above steps of the processes of FIGS. 2-8 can be executed or performed substantially simultaneously where appropriate or in parallel to reduce latency and processing times.

It should also be noted that, as used herein, the term mechanism can encompass hardware, software, firmware, or any suitable combination thereof.

Accordingly, systems, methods, and media for presenting media content are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for presenting content, the system comprising:
   a media receiving device comprising:
      a memory; and
      a hardware processor that, when executing computer-executable instructions stored in the memory, is configured to:
         establish a communication channel for communication with a sending application executing on a computing device over a local area network in response to a request from the sending application to establish the communication channel;
         in response to establishing the communication channel, launch a receiving application, wherein the receiving application is an application programming interface stored on the media receiving device for communication with the sending application executing on the computing device;
         receive a request, using the receiving application, from the sending application executing on the computing device, to present a media content item that is being presented on a display of the computing device, wherein the request includes: an identifier of the media content item and an identifier of a content presentation application executing on the computing device to present the media content item;

launch a content streaming application, wherein launching the content streaming application comprises creating an application context that sets a target destination for commands received from the sending application, wherein the target destination corresponds to at least one element of the content streaming application;

transmit a request that includes the identifier of the media content item to a server from which the media content item is available;

receive the media content item from the server;

in response to receiving the media content item, cause the media content item to begin being presented using the content streaming application executing on the media receiving device, and receive, during presentation of the media content item, a playback modification command from the computing device while information about the media content item is being presented on the display of the computing device.

2. The system of claim 1, wherein the hardware processor is further configured to:

in response to receiving the playback modification command, cause, by the media receiver device, presentation of the media content item to be modified in a manner corresponding to the playback modification command.

3. The system of claim 2, wherein the playback modification command is a command to pause presentation of the media content item.

4. The system of claim 2, wherein the playback modification command is received via a non-persistent communication channel with the computing device.

5. The system of claim 1, wherein the request includes timing information that indicates a playback position of the media content item on the computing device.

6. The system of claim 1, wherein the hardware processor is further configured to request an authentication token from the content presentation application executing on the computing device.

7. A method for presenting content, the method comprising:

establishing, using a hardware processor, a communication channel for communication with a sending application executing on a computing device over a local area network in response to a request from the sending application to establish the communication channel;

upon establishing the communication channel, launching a receiving application, wherein the receiving application is an application programming interface stored on the media receiving device for communication with the sending application executing on the computing device;

receiving a request, using the receiving application, from the sending application executing on the computing device, to present a media content item that is being presented by the computing device, wherein the request includes: an identifier of the media content item and an identifier of a content presentation application executing on the computing device to present the media content item;

launching a content streaming application, wherein launching the content streaming application comprises creating an application context that sets a target destination for commands received from the sending application, wherein the target destination corresponds to at least one element of the content streaming application;

transmitting a request that includes the identifier of the media content item to a server from which the media content item is available;

receiving the media content item from the server; and upon receiving the media content item, causing the media content item to begin being presented using the content streaming application executing on the media receiving device, and receive, during presentation of the media content item, a playback modification command from the computing device while information about the media content item is being presented on the display of the computing device.

8. The method of claim 7, further comprising:

upon receiving the playback modification command, causing, by the media receiver device, presentation of the media content item to be modified in a manner corresponding to the playback modification command.

9. The method of claim 8, wherein the playback modification command is a command to pause presentation of the media content item.

10. The method of claim 8, wherein the playback modification command is received via a non-persistent communication channel with the computing device.

11. The method of claim 7, wherein the request includes timing information that indicates a playback position of the media content item on the computing device.

12. The method of claim 7, further comprising requesting an authentication token from the content presentation application executing on the computing device.

13. A non-transitory computer-readable medium containing computer executable instructions that, when executed by a processor, cause the processor to perform a method for presenting content, the method comprising:

establishing a communication channel for communication with a sending application executing on a computing device over a local area network in response to a request from the sending application to establish the communication channel;

upon establishing the communication channel, launching a receiving application, wherein the receiving application is an application programming interface stored on the media receiving device for communication with the sending application executing on the computing device;

receiving a request, using the receiving application, from the sending application executing on the computing device, to present a media content item that is being presented by the computing device, wherein the request includes: an identifier of the media content item and an identifier of a content presentation application executing on the computing device to present the media content item;

launching a content streaming application, wherein launching the content streaming application comprises creating an application context that sets a target destination for commands received from the sending application, wherein the target destination corresponds to at least one element of the content streaming application;

transmitting a request that includes the identifier of the media content item to a server from which the media content item is available;

receiving the media content item from the server; and upon receiving the media content item, causing the media content item to begin being presented using the content streaming application executing on the media receiving device, and receive, during presentation of the media content item, a playback modification command from the computing device while information about the media content item is being presented on the display of the computing device.

14. The non-transitory computer-readable medium of claim 13, wherein the method further comprises:
upon receiving the playback modification command, causing, by the media receiver device, presentation of the media content item to be modified in a manner corresponding to the playback modification command.

15. The non-transitory computer-readable medium of claim 14, wherein the playback modification command is a command to pause presentation of the media content item.

16. The non-transitory computer-readable medium of claim 14, wherein the playback modification command is received via a non-persistent communication channel with the computing device.

17. The non-transitory computer-readable medium of claim 13, wherein the request includes timing information that indicates a playback position of the media content item on the computing device.

18. The non-transitory computer-readable medium of claim 17, wherein the method further comprises requesting an authentication token from the content presentation application executing on the computing device.

* * * * *